Aug. 27, 1968  M. K. ABDO  3,398,792
LIQUID FLOW IN A PERMEABLE EARTH FORMATION
Original Filed March 16, 1964  9 Sheets-Sheet 1

INVENTOR.
MILTON K. ABDO
BY James C. Fails
PATENT AGENT

United States Patent Office 3,398,792
Patented Aug. 27, 1968

3,398,792
LIQUID FLOW IN A PERMEABLE EARTH FORMATION
Milton K. Abdo, Dallas, Tex., assignor to Mobil Oil Corporation, a corporation of New York
Original application Mar. 16, 1964, Ser. No. 351,936. Divided and this application Nov. 23, 1966, Ser. No. 623,149
5 Claims. (Cl. 166—9)

ABSTRACT OF THE DISCLOSURE

This specification discloses a method of treating a subterranean formation by passing into and flowing in the formation a liquid which is either positive nonsimple, shear hardening, or both. In specific embodiments, various liquids, both miscible and immiscible, are employed as flooding liquids and flowed from an injection well within the formation toward a production well to recover a large portion of the oil from the subterranean formation. By the rheological properties of shear hardening and/or positive nonsimplicity, the flooding liquids correct for permeability inhomogeneities as well as instability effects. Illustrative of the immiscible liquids having the desired rheological properties are aqueous solutions of alkaline soaps of fatty acids with electrolyte present where appropriate, aqueous solutions of copper cetyl phenyl ether sulfonate, and aqueous solutions of acid soap and acid; such as, hexadecylamide hydrochloride and hydrochloric acid. Illustrative of the miscible liquids having these rheological properties are hydrocarbon solutions of aluminum soaps of fatty acids or of naphthenic acids, or solutions containing at least 2 percent by weight nitrocellulose dissolved in n-butyl acetate.

---

This is a division of application Ser. No. 351,936, filed Mar. 16, 1964.

This invention relates to the flow of a liquid in a permeable earth formation. More particularly, this invention pertains to recovering oil from subterranean formations. Still more particularly, this invention is directed to recovering oil from a subterranean formation by flowing therethrough a flooding liquid.

In various operations for the treatment of a permeable subterranean formation, a liquid is passed into the formation from a well penetrating the formation. For example, for the treatment of a subterranean formation to improve recovery of oil therefrom, a liquid is flowed into the formation from a well passing from the surface of the earth to the formation. In one such operation, the liquid is flowed into the formation to displace the oil from the formation to a production well.

The oil accumulated in subterranean formations is recovered or produced therefrom through wells, called production wells, drilled into the subterranean formations. A large amount of the oil is left in a subterranean formation if produced only by primary depletion, i.e., where only initial formation energy is used to recover the oil. To improve the extent of recovery, supplemental operations, often referred to as secondary recovery operations, are used. In the most successful and most widely used supplemental recovery operations, a fluid, as indicated above, is injected through at least one well, called an injection well, and passed through the formation. Oil is moved through the formation and is produced from a production well or wells thereabout, as the injected fluid passes from the injection well to the production wells.

Two major types of sweep efficiency—macroscopic or areal sweep efficiency and microscopic sweep efficiency—influence the effectiveness of the passage of the injected fluid through the formation.

The first type, the macroscopic or areal sweep efficiency, is most seriously affected by the permeability stratification of the subterranean formation and by the difference between the viscosity of the in-situ oil and the injected fluid. In any operation in which a fluid is injected through an injection well into a subterranean formation, permeability stratification is significant. It is most significant in secondary recovery operations. By causing a disproportionately large amount of the injected fluid to enter the more permeable zones, it results in premature production of the injected fluid at production wells thereabout. This premature production is referred to as premature breakthrough and is reflected as an increasing ratio of the injected fluid to the oil in the produced fluids. Thus, premature breakthrough can render an otherwise well-engineered recovery project relatively ineffective because of the cost of treating and recycling the injected fluid.

A sharp difference in viscosity between that of the in-situ oil and that of the injected fluid creates a situation referred to as instability when the viscosity of the injected fluid is less than that of the in-situ oil. The less viscous injected fluid tends to develop fingers or bulges which may be caused by a point of minute inhomogeneity in the formation. These fingers grow and travel at a much faster rate than the remainder of the injected fluid and thus also cause premature breakthrough.

Various means have been proposed to avoid premature breakthrough. Selective plugging operations have been taught to correct permeability stratification. Viscosity gradation, wherein an intermediate fluid or fluids having a viscosity between that of the injected fluid and that of the in-situ oil is employed, is taught to cure or minimize instability fingering. One method which has been taught to correct both the permeability stratification and the instability fingering involves the use of a thickener in the leading edge of the flooding or displacing liquid comprising one of the injected fluids. More specifically, it has been taught to add thickeners to the leading edge of a waterflood, i.e., a recovery operation where the injected displacing liquid is water.

The second type, the microscopic sweep efficiency, is influenced by the interfacial tension and the contact angle between the injected fluid and the in-situ oil, and the permeability of the formation. Available methods of altering permeability, such as fracturing or acidizing, are of limited benefit. The greater the interfacial tension, the more resistance the displacing fluid will encounter in attempting to flush the oil from the more restricted interstices of the formation. To achieve improved microscopic sweep efficiency, it has been taught to add a surfactant to a flooding liquid to decrease the interfacial tension and to alter the contact angle.

Despite experimental and field use of the foregoing additives and methods, much oil continues to remain in a subterranean formation after the best recovery mechanisms heretofore known have been employed.

Therefore, it is an object of this invention to provide additives and additive systems for solutions used in the treatment of a permeable subterranean formation.

It is a more specific object of this invention to provide additives and additive systems which will enhance the oil recovery capability of a flooding liquid to which they are added.

It is also an object of this invention to provide a flooding liquid tending to even out injection and flow profiles in a subterranean formation, thus benefiting the distribution patterns of any other fluids injected concurrently, alternately, or subsequently.

More particularly, it is an object of the invention to provide a flooding liquid which will increase both the macroscopic and the microscopic sweep efficiencies of a flooding operation.

It is another object of the invention to provide a method of recovering additional oil by passing through a subterranean formation a flooding liquid which will increase both the mascroscopic and microscopic sweep efficiencies of the flooding operation.

It is another object of the invention to provide a method of decreasing the flow of a flooding liquid in more permeable domains relative to flow in less permeable domains of a subterranean formation.

In accordance with the invention, in the treatment of a permeable subterranean formation wherein a liquid is flowed into the formation from an injection well, a positive nonsimple liquid is employed. In a specific aspect of the invention, in the recovery of oil from a subterranean formation by injecting a flooding liquid through an injection well and into the formation and producing oil from the formation through a production well, a positive nonsimple liquid is employed as the flooding liquid.

The use of the positive nonsimple liquid will provide advantages in formations having permeability stratification. A positive nonsimple liquid is a liquid whose viscosity varies in the same direction as the permeability, $k$, when it flows in various porous solids at the same nominal shear rate, $$\frac{V}{(k)^{1/2}}$$

within limits. Viscosity of a liquid flowing in a formation or in a core sample therefrom, often called apparent viscosity, is determined from Darcy's law as follows:

$$\mu = \frac{k}{V}\left(-\frac{\partial P}{\partial X}\right)$$

In these expressions, $k$ = permeability, in darcies, of the porous solid, formation, or core sample,
$\mu$ = viscosity in centipoises of the liquid,
$V$ = Darcy velocity of the flow of the liquid, or the volume flux rate per unit area, in centimeters per second,
$P$ = pressure in atmospheres, and
$X$ = length, in centimeters, along the linear axis of the pressure gradient.

Thus, at any nominal rate of shear the apparent viscosity of a positive nonsimple liquid will be equal to or higher in a more permeable stratum in a subterranean formation than in a less permeable stratum. Within a certain range of shear rates, the apparent viscosity will be higher in a more permeable stratum. The liquid thus is "active" in the sense that it adjusts its properties to flow at a rate which is relatively insensitive to permeability of a subterranean formation.

In the practice of the invention, the positive nonsimple liquid employed, as discussed more fully hereinafter, will be a solution of a solute in a solvent.

Each subterranean formation contains a spectrum of domains of different permeabilities. If more permeable domains predominate in a particular stratum in a formation, the stratum will have a higher average permeability than a stratum where less permeable domains predominate. Typically, a stratum having, for example, an average permeability of 400 millidarcies will be comprised of a spectrum of domains ranging in permeabilities from 200 to 800 millidarcies.

When injected through an injection well into a subterranean formation, a positive nonsimple liquid tends to even out or compensate for permeability variations because of its own internal flow control mechanism. This internal flow control mechanism operates to increase the apparent viscosity of the liquid in the more permeable domains over that in the less permeable domains within the formation. The internal flow control mechanism is particularly effective where there are strata having different average permeabilities. Thus, the injected positive nonsimple liquid tends to flow at a more nearly uniform velocity in all strata in the subterranean formation regardless of the permeability therein. As a result, more oil is recovered before breakthrough of the flooding liquid.

Figure 1:
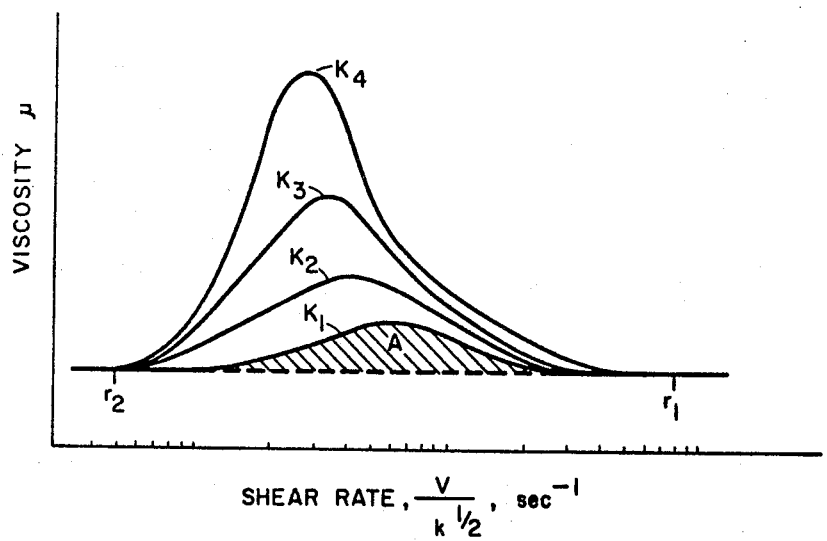
FIGURE 1 is a plot of a typical apparent viscosity response of a nonsimple liquid as a function of shear rate in strata having different average permeabilities, $k$.

Typical behavior of a positive nonsimple liquid is shown in FIGURE 1 where the apparent viscosity, $\mu$, of the liquid flowing in permeable strata is plotted versus the nominal shear rate of the liquid in the strata, as calculated from the velocity, $V$, divided by the square root of the permeability, $k^{1/2}$. In this figure, the permeability of the stratum for curve $K_4$ is higher than the permeability of the stratum for curve $K_3$. Similarly, the permeability of the stratum for curve $K_3$ is higher than the permeability of the stratum for curve $K_2$. The permeability of the stratum for curve $K_2$ is also higher than the permeability of the stratum for curve $K_1$. The better a positive nonsimple liquid performs as a flooding liquid, the greater will be the area, typified by area A in the figure, under the curve representing its viscosity as a function of shear rate in a stratum having a particular permeability, $k$.

The area A gives a comparative evaluation of the integral $$\int_{\left(\frac{V}{k^{1/2}}\right)_{r_2}}^{\left(\frac{V}{k^{1/2}}\right)_{r_1}} \mu d \ln\left(\frac{V}{k^{1/2}}\right) = A$$

where $\mu$ = viscosity,
$V/k^{1/2}$ = nominal shear rate,
$V$ = velocity,
$k$ = permeability,
$r_1$ = radius from the injection well at which the shear rate is low enough to sustain a positive viscosity variation (for evaluating the integral it can be assumed equal to the radius of the injection well),
$r_2$ = radius from the injection well at which the shear rate is high enough to develop a positive viscosity variation (for evaluating the integral it can be assumed equal to one-half the distance to the production well), and
$A$ = activity of the positive nonsimple liquid.

Positive nonsimple liquids having a greater activity, i.e., a greater value of A, begin to show a positive viscosity variation at lower rates of shear and have higher viscosities at all rates of shear within the limits of effectiveness than do less "active" liquids.

If a nonsimple liquid develops a lower viscosity when it flows in more permeable strata than when it flows in parallel-connected flow in less permeable strata, it is a negative nonsimple liquid in the sense of this invention. If the apparent viscosity of a liquid does not change when it flows in parallel through strata having varying permeabilities, the liquid is a simple liquid.

Insofar as is presently known, all liquids which are positive nonsimple liquids have a range of shear rates in which increasing shear rate increases their apparent viscosity. This range is referred to as the shear hardening or shear thickening region. However, although shear hardening is a sufficient condition to render a liquid effective in the method of the invention, it is not a necessary condition.

Shear hardening, or shear thickening, is a fairly unusual rheological property. It has been observed in some past experimental work with non-Newtonian liquids and has been variously reported, not always correctly, in terms of the liquids being dilatant, rheopetic, or negatively thixotropic. Whether any non-Newtonian liquid exhibits the property of shear hardening or not can be determined by its viscosity (ratio of stress to rate of shear measured at the wall of the viscometer container) at given rates of shear measured on a viscometer, such as the Couette or Brookfield viscometers. Typical curves are illustrated in FIGURE 2.

Figure 2:
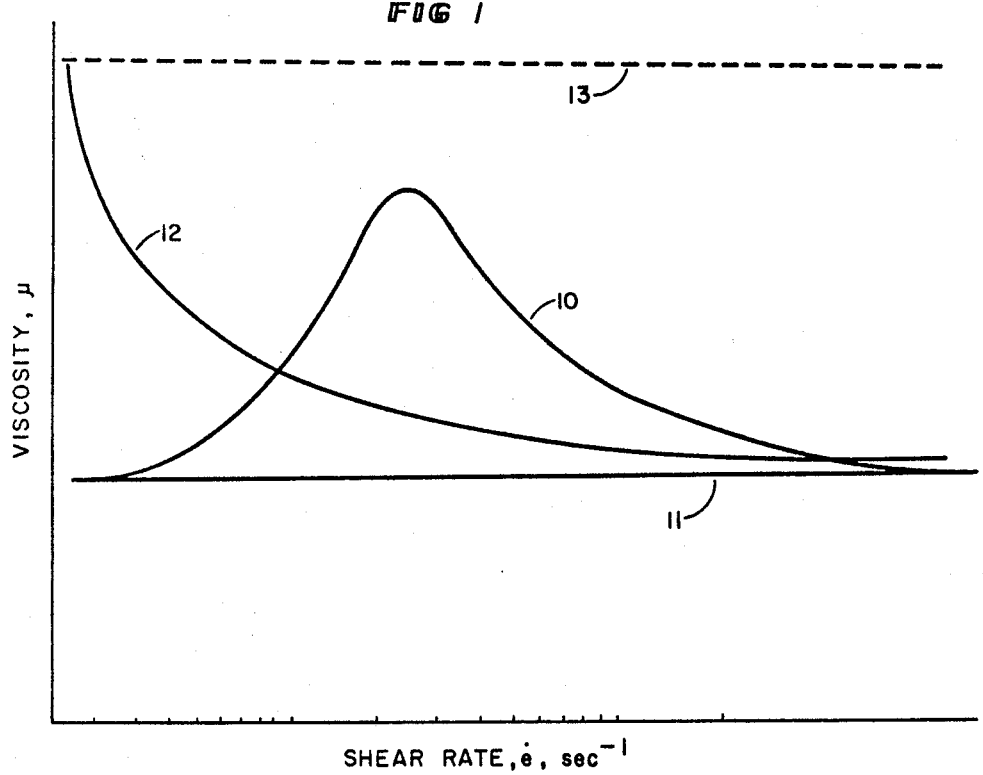
FIGURE 2 is a plot of typical viscosity responses of various kinds of liquids as a function of shear rate.

Referring to FIGURE 2, a liquid which exhibits the rheological property of shear hardening or shear thickening will have a viscosity curve similar to curve 10. The viscosity will increase at increasing rates of shear, within limits, above the constant viscosity of a Newtonian liquid having the same initial viscosity, e.g., curve 11. There will be a finite shear rate at which this viscosity will pass through a maximum. Beyond this, a shear rate increase will bring about a decrease in viscosity, i.e., curve 10 will eventually return to curve 11 at some rate of shear. Every liquid which exhibits a region of shear hardening is useful in the method of the invention. However, those liquids which also are positive nonsimple liquids are more effective since they compensate for continuously varying permeability. They also compensate more effectively over wider variations in permeability.

The majority of known non-Newtonian liquid systems have the property of shear thinning. As shown by curve 12 in FIGURE 2, a shear thinning non-Newtonian liquid will exhibit a viscosity which is lower at high rates of shear than a Newtonian fluid having the same initial viscosity, e.g., curve 13.

Figure 3:
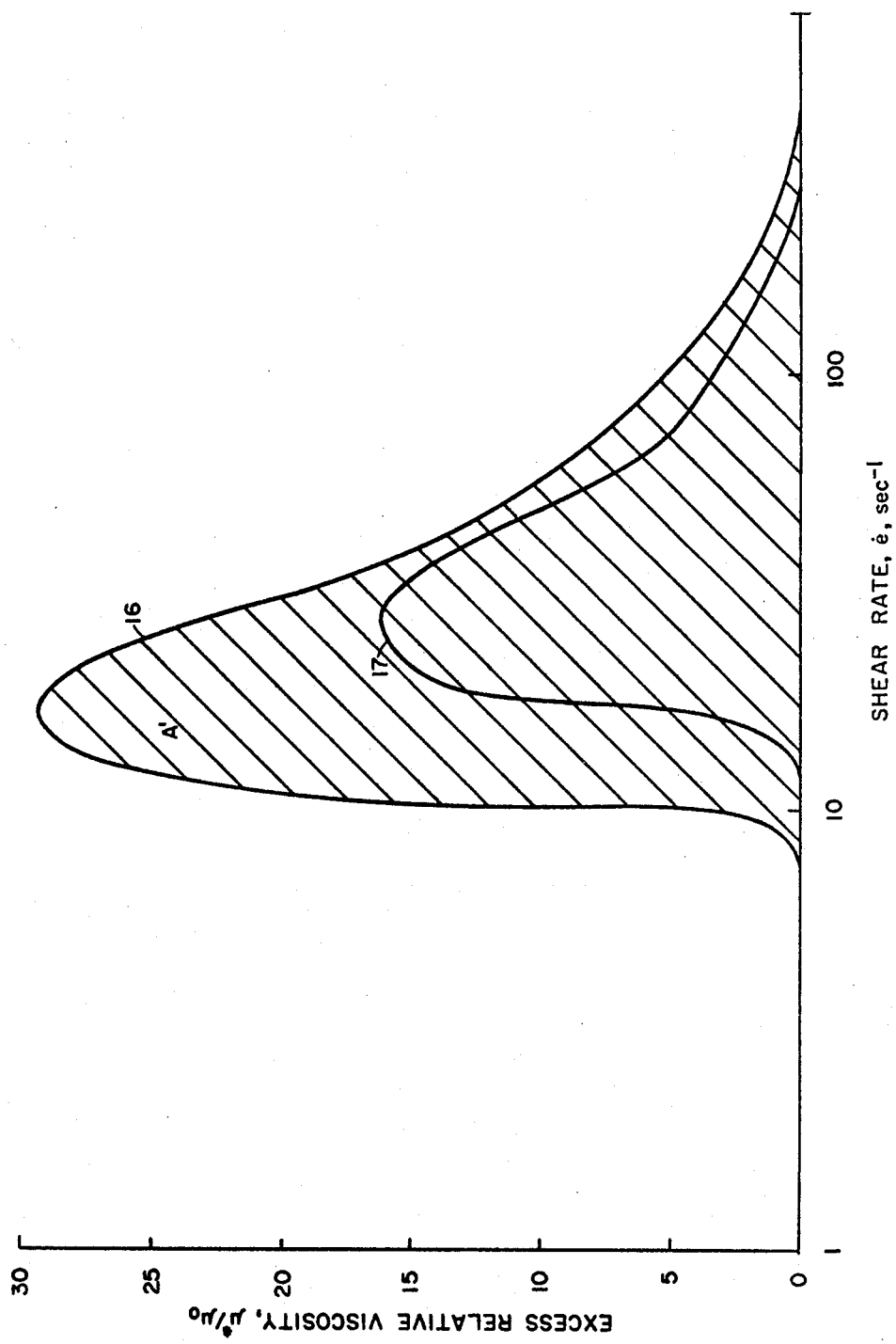
FIGURE 3 is a plot of excess relative viscosity, defined below, of a positive nonsimple liquid as a function of shear rate.

Flow experiments, for example, employing long core samples, in which apparent viscosity can be measured as a function of shear rate are very time consuming. Fortunately, the viscometers, such as the Couette or Brookfield viscometers, having concentric cylinders afford a good correlation with behavior in a subterranean formation. Liquids which show an increase in viscosity with larger gap sizes on the viscometer at certain given rates of shear are useful in the method of the invention. The gap size in such a viscometer is simply the distance separating the concentric cylinder walls immersed in the liquid. A typical curve for a solution is shown in FIGURE 3. In the figure, curve 16 is a plot of the excess relative viscosity, i.e., the viscosity of the solution above that of the solvent divided by that of the solvent to provide a dimensionless number, versus the shear rate at a gap size of 0.1232 centimeter. Curve 17 is a plot of the excess relative viscosity of the same solution using a gap size of 0.0790 centimeter. Thus, the solution is a positive nonsimple liquid. The area A', e.g., under curve 16, affords an index of the activity of the liquid, i.e., its efficacy as a flooding liquid for recovering oil. It is particularly indicative of the liquid's internal flow control capability, i.e., the ability of the liquid to flow at a more nearly uniform velocity in all strata in a formation regardless of the permeability of each respective stratum. This area, A', is an evaluation of the integral $$\int_{\dot{e}_1}^{\dot{e}_2} \left(\frac{\mu^*}{\mu_0}\right) d \ln \dot{e} = A'$$

where $\dot{e}$ = shear rate in sec.$^{-1}$,
$\dot{e}_1$ = minimum rate of shear at which a positive viscosity variation is developed; can be assumed to be 0 herein,
$\dot{e}_2$ = maximum rate of shear at which a positive viscosity variation is sustained; can be assumed to be $\infty$ for liquids where $\mu^*/\mu_0$ returns to 0,
$\mu^* = \mu - \mu_0$,
$\mu$ = viscosity of the solution in centipoises (for evaluations of activity indices herein),
$\mu_0$ = viscosity of the solvent in centipoises, and
$A'$ = activity index.

This integral is empirically analogous to the integral $$\int_{\left(\frac{V}{k^{1/2}}\right)_{r_2}}^{\left(\frac{V}{k^{1/2}}\right)_{r_1}} \mu d \ln\left(\frac{V}{k^{1/2}}\right)$$

and is indicative of the relative efficacy of a liquid as a flooding liquid.

It becomes convenient to give subjective estimates of the area, A', instead of planimetering each curve for an indication of effectiveness of a liquid when many liquids are tested. Such subjective estimates can best be described in terms of rank or symbols representative of the efficacy of the liquid being evaluated. Approximate quantitative values for the areas can be ascribed to the rank or symbols. The data included herein is reported using the symbols. Table I below explains the symbols. It gives the approximate evaluation of the integral, A', i.e., the area under the curve representing its excess relative viscosity as a function of shear rate using a Couette device, the U.L. adapter of a Brookfield Model LVT Synchro-Lectric Viscometer having variable revolutions per minute, and using a gap size of 0.1232 centimeter between concentric cylinders having radii of 1.2573 and 1.3805 centimeters. It also gives the relative efficacy of the liquids as flooding liquids, i.e., how much more effective is the solution than the solvent. Liquids having a rank above X are active and are useful in the method of the invention.

TABLE I

| Rank or Symbol | $\int_{\dot{e}_1}^{\dot{e}_2} \left(\frac{\mu^*}{\mu_0}\right) d \ln \dot{e}$ | Effective |
|---|---|---|
| X | 0 | Not. |
| S | 1–3 | Slightly. |
| M | 4–10 | Moderately. |
| V | 11–20 | Very. |
| $V_2$ | 21–50 | Highly. |
| $V_3$ | >50 | Extremely. |

Typical behavior of a positive nonsimple liquid when used as a flooding liquid is shown in the following example. A dilute aqueous solution which was a positive nonsimple liquid having a ranking symbolized by $V_2$ gave an integrated area, A′, under its curve 16, as shown in FIGURE 3, of 43. It was highly effective in increasing the recovery of oil at breakthrough from a core sample over that of water alone. It was used in displacing Sovasol, a paraffinic hydrocarbon cut just below kerosine in its boiling point range, from a core sample composed of crushed quartz consolidated with calcium aluminate. The core sample was designated Model C and had a diameter of 1.21 centimeters, a length of 113.03 centimeters, a pore volume of 52.5 milliliters, a porosity of 40.35 percent, and a permeability of 1.34 darcies. Model C was saturated with Sovasol to 100 percent saturation. The Sovasol represented the oil phase. It is hereafter referred to as oil in connection with the core sample models. The oil was flooded from the core sample using water alone and the core sample was again resaturated to 100 percent oil saturation. The oil was then flushed from the core sample using the dilute aqueous positive nonsimple liquid. Duplicating runs were made to verify the results. To reduce the residual oil saturation to 53 percent required approximately 2.84 pore volumes of water and entailed production at a water-oil ratio of approximately 61. By contrast, 1.47 pore volumes of the dilute aqueous positive nonsimple liquid reduced the residual oil saturation to 53 percent, entailing a solution-oil ratio of only 21.

The high degree of effectiveness of the positive non-simple liquid is shown more clearly in a model simulating a formation having noncommunicating strata of different average permeabilities. Two core samples having different permeabilities were connected in parallel. Specifically, the above-described Model C was connected in parallel with a Model U, a core sample of unconsolidated highly angular crushed quartz. Model U had a diameter of 1.306 centimeters, a length of 120.65 centimeters, a pore volume of 70 milliliters, a porosity of 44 percent, and a permeability of 30.4 darcies. This Model C and Model U in parallel is referred to as a stratified model or Model S. With Model C and Model U saturated to 100 percent with oil and the oil displaced with water, the water broke through Model U when it had displaced only 4.76 percent of the pore volume of Model C. When resaturated with oil and the displacement repeated using the dilute aqueous solution comprising a positive nonsimple liquid, 34.1 percent of the pore volume of Model C was displaced before the solution broke through Model U.

An M-ranked positive nonsimple liquid is less effective, as the activity index indicates. When oil is displaced from the Model S in the same laboratory experiment, only 18.1 percent pore volume is displaced from Model C before breakthrough in the parallel-connected Model U. While this percentage is appreciably greater than the 4.76 percent realizable by waterflood alone, it is less than the 34.1 percent achieved by the $V_2$-ranked positive nonsimple liquid.

The relative activity of the positive nonsimple liquids is also illustrated by flow behavior in the Model U and Model C. The actual flow through each model was measured under a ΔP of 0.08 atmosphere. The flow from Model C was multiplied by $$\left(\frac{\text{permeability of Model U}}{\text{permeability of Model C}}\right)$$

to afford a permeability-corrected basis for comparison. A $V_2$-ranked liquid flowed at an actual rate of 6.4 cubic centimeters per hour in Model U and at a comparative or permeability-corrected rate of 40.9 cubic centimeters per hour in the less permeable Model C, with the ΔP of 0.08 atmosphere. An M-ranked liquid flowed at an actual rate of 32 cubic centimeters per hour in Model U and at a comparative rate of 100 cubic centimeters per hour in Model C, with the ΔP of 0.08 atmosphere. The $V_2$-ranked liquid corrects by more than sixfold, while the M-ranked liquid corrects by only about threefold for permeability variation.

Figure 4:
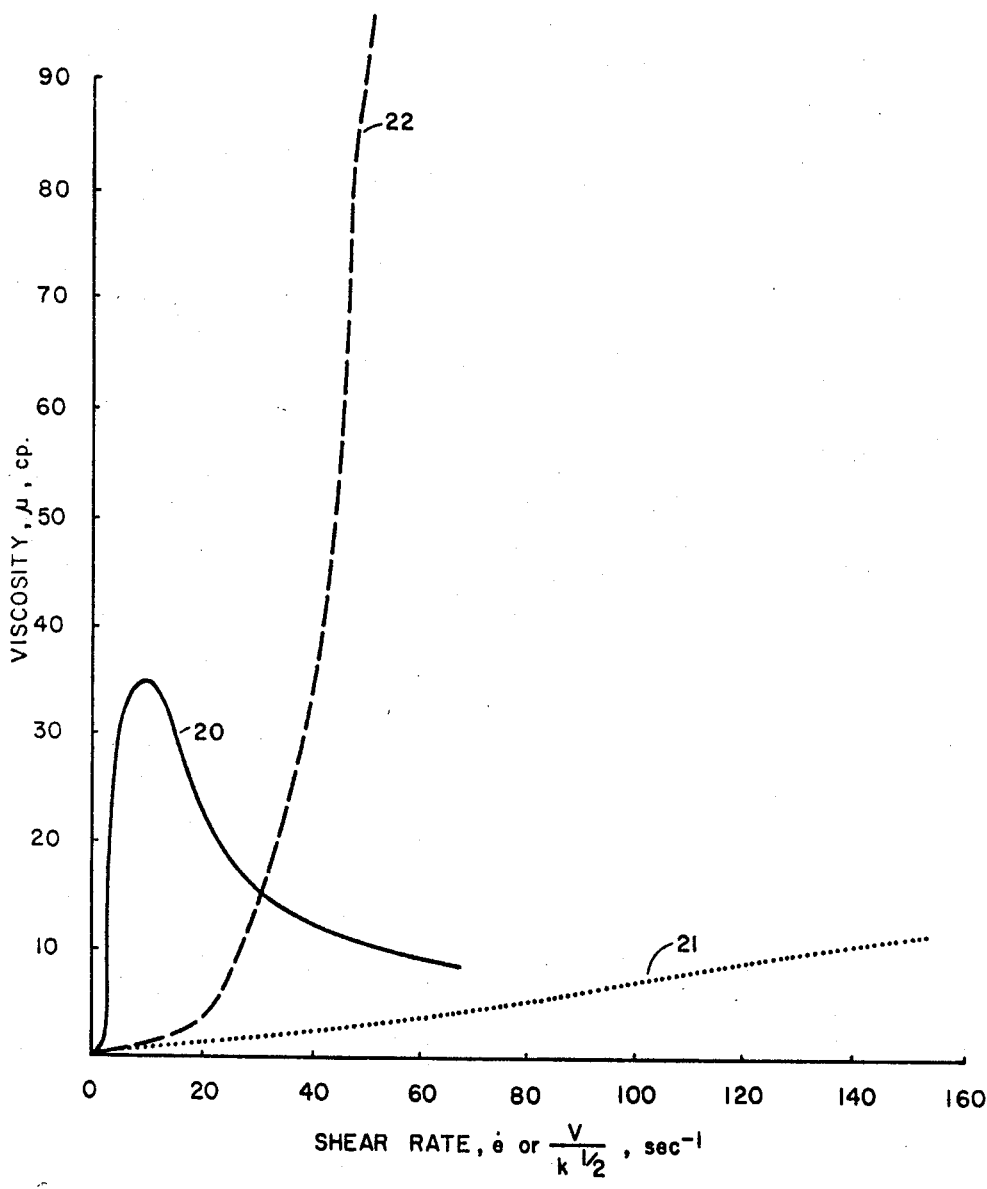
FIGURE 4 is a plot of the viscosity response of a positive nonsimple liquid to shear rate in a viscometer and in two core samples having different permeabilities.

The activity of a positive nonsimple liquid, indicated by viscometer data, is further illustrated in FIGURE 4. Therein the viscosity variation of the liquid with shear rate in a Couette viscometer and in porous solids, such as consolidated core samples, is plotted. Curve 20 is a plot of the viscosity measured in a Couette device (the U.L. adapter of a Brookfield Model LVT Synchro-Lectric Viscometer having variable revolutions per minute). Curve 20 shows a region of shear hardening. Curve 21 is a plot of the viscosity measured in a core sample having a permeability of 410 millidarcies. Curve 22 is a plot of viscosity measured in a core sample having a permeability of 4160 millidarcies. The positive nonsimple liquid thus exhibits a dramatic increase in its apparent viscosity in the more permeable core sample. Hence, the liquid flows much less readily in zones of higher permeability than in zones of lower permeability.

Figure 5:
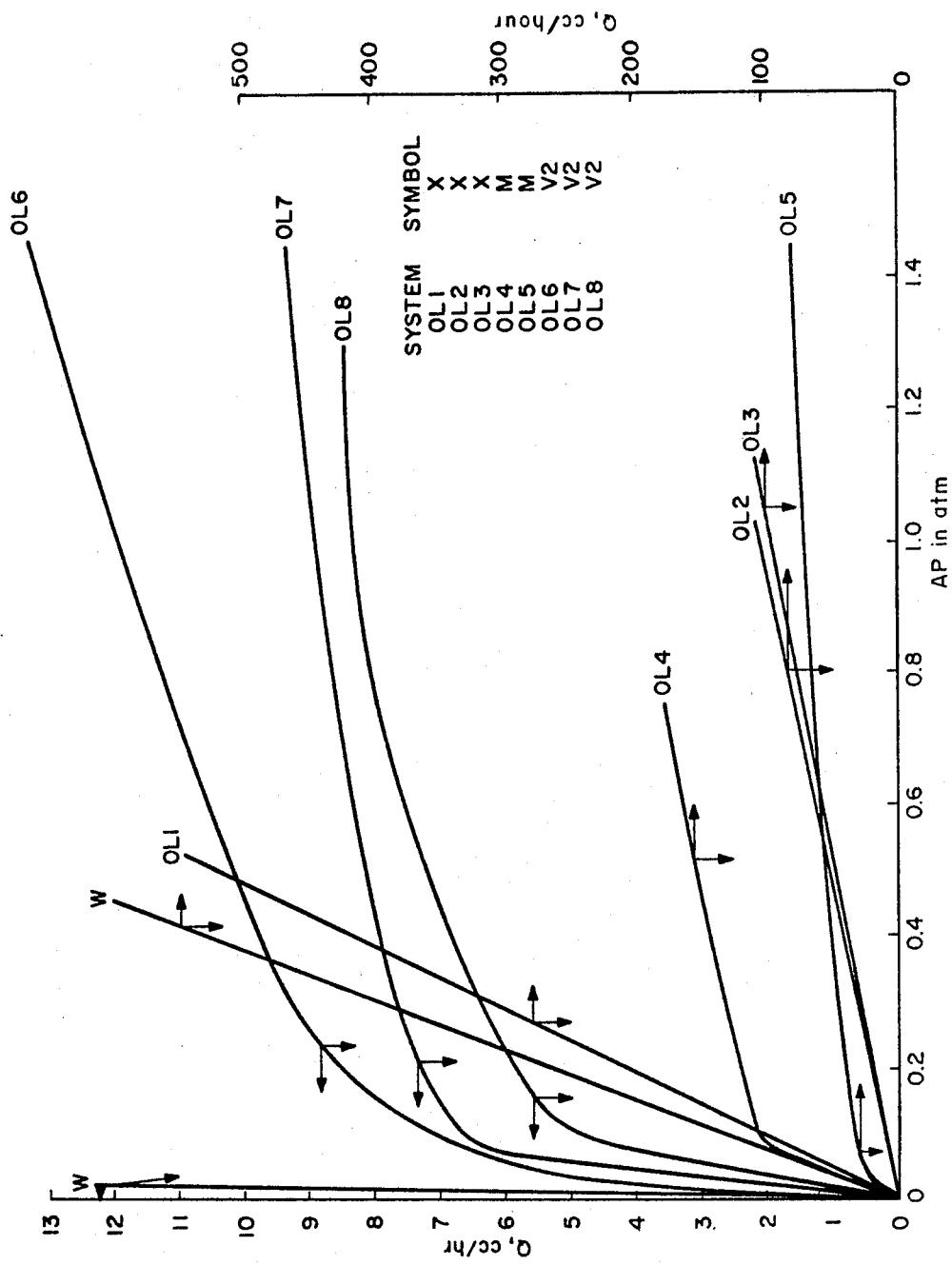
FIGURE 5 is a plot of flow rate of several liquids through a model comprising an unconsolidated sand pack as a function of pressure drop.

The decrease in flow of a positive nonsimple liquid in more permeable channels with certain pressure drops is compared with that of water in FIGURE 5. Therein, the flow rate, Q, in cubic centimeters per hour of various liquids, i.e., solutions of additives or combinations of additives, hereinafter called "systems," with their symbols designating their flooding effectiveness, through Model U is plotted as a function of the pressure drop, ΔP, in atmospheres across the model. Those of the liquids which are not positive nonsimple liquids, i.e., are simple liquids, denoted by symbol X, plot a straight line. Thus, even though the systems may be thickeners, the liquids exhibit the same flow characteristics as water. Such simple liquids decrease their flow rates proportionally in all strata regardless of permeability. They do not exhibit sensitivity to gap size in the Brookfield viscometer, and they do not cause a proportionally greater flow rate in less permeable strata. Conversely, the positive nonsimple liquids plot a curved line, exhibiting flow characteristics very different from water. Practically, they reduce their flow rates much more dramatically in the more permeable strata than in the less permeable strata. A measure of the efficacy of the liquid as a flooding liquid is the Q at which its plot begins to curve away from the water plot. Any positive nonsimple liquid which curves away from the water plot in the manner illustrated will tend to even out the injection and flow profile of a flooding liquid.

Most of the additives for flooding liquids previously suggested in the prior art are thickeners. The liquids containing these thickeners are not positive nonsimple liquids, but are simple liquids. Many such thickeners exhibit the property of shear thinning, however. When these thickeners are added to the leading edge of a flooding liquid, the viscosity gradation ratio may be improved. However, the problem of permeability stratification is not solved by a simple liquid exhibiting shear thinning.

Many of these additives actually cause the flooding liquid to develop a lower apparent viscosity in the more permeable zones. In zones where relatively little shear is experienced, as in zones of low permeability, they offer higher resistance to flow and occasionally form a gel therein, blocking the relatively impermeable zone or strata. In evaluating many of the prior art additives for the treatment of a subterranean formation, however, it has been found that there are a few instances in certain very restricted ranges of concentration under very specific circumstances not taught by the prior art wherein the desired properties can be induced. Where these properties can be induced into a flooding liquid, an increased recovery is effected in flooding experiments.

Some positive nonsimple liquids have a lowered interfacial tension between themselves and the in-situ oil. Others achieve relatively the same additional recovery of oil at breakthrough without nearly as substantial a reduction in interfacial tension. Thus, lowered interfacial tension is not the primary mechanism responsible for the activity of the positive nonsimple liquids of the invention.

The following is a detailed description of positive nonsimple liquids for use as active flooding liquids and the liquids are divided into two types. The first type is immiscible flooding liquids, particularly aqueous solutions. The second type is miscible flooding liquids, particularly hydrocarbon solutions.

Immiscible flooding liquid

Water is the most commonly used immiscible flooding liquid. Water, as used herein, means the flooding liquid commonly used in waterfloods. It includes common oil field brines and commonly available dilute aqueous solutions, such as surface water. The following additives for water are discussed from the standpoint of being added to at least a part of the floodwater to induce the internal flow control capability by converting at least a portion of the water to a positive nonsimple liquid; more specifically, to a positive nonsimple liquid having the rheological property of shear hardening and being useful in the method of the invention. In the various embodiments described, specific compounds or chemicals are disclosed as being added to the flooding water to obtain the desired positive nonsimple liquid. It will be readily apparent that the addition, or end result, can also be accomplished by effecting any suitable chemical reaction or ion exchange, e.g., by adding a particular base and reacting it with a particular acid to form directly in the aqueous solution the specific chemicals disclosed. The resulting solutions will be the same as those described in the embodiments and are within the scope of this invention. These positive nonsimple liquids demonstrate an activity beyond that of mere water or thickened water.

The particular additive system may be added to only a portion of the water to create a slug or slugs of a positive nonsimple liquid having a volume of from 0.1 to 30 percent, preferably 1 to 10 percent, of the hydrocarbon pore volume of the formation. The slugs of positive nonsimple liquid are injected through the injection well and passed into the formation. Such slugs may be injected once or alternately with larger volumes of untreated water between alternate slugs to achieve the desired recovery of oil from the subteranean formation. Obviously, water having lower concentrations of additives and hence less activity may be used between alternate slugs instead of untreated water. Each treated slug tends to even out the flow, to alter the pressure gradients, and more nearly to compensate for permeability stratification. Hence, the greater the number of treated slugs, the more effective will be the flood. Obviously, greater recovery of oil will be obtained from a subterranean formation if the entire flooding liquid is converted to a positive nonsimple liquid. This is, of course, more expensive and the particular formation will dictate the economics of the amount and frequency of the slugs which are to be injected, ranging from only one slug to treating all of the flooding water.

Several of the additives and additive systems which follow comprise soap systems. These systems in water are referred to herein as solutions since the resulting clear liquid flows into permeable core samples without any loss of additive by filtering action.

The soap systems are divided into two types—saturated soaps and unsaturated soaps. The unsaturated soap systems require more additive to form a positive nonsimple liquid. However, they are more soluble and tolerate higher concentrations of sodium chloride than do the saturated soap systems. The saturated soap systems are useful in formations having higher temperatures, as illustrated by data for each embodiment. "Saturated" as employed herein means that the carbon chain in the soap is saturated with hydrogen atoms. Typical examples are the stearates and palmitates. Unsaturated is used herein to denote soaps having carbon chains which are not saturated with hydrogen atoms, e.g., the oleates. The entire family of soap systems can be described generically under a generalized formula as shown below:

$$(X)(A)$$
$$[(Y)(B)]_a$$

and $$[(Y)(C)]_b$$

where

X is alkali metal, such as potassium and sodium; ammonium; amine; and alkanolamine ions;
A is oleate, palmitate, elaidate, and stearate;
Y is potassium, sodium, and ammonium;
B is a halide;
C is hydroxide and carbonate;
$a$ is 0 to 5 percent by weight; and
$b$ is 0 to that sufficient to give a pH greater than 7.

The alkaline soaps, i.e., the alkali metal, ammonium and amine soap systems, form alkaline aqueous solutions in neutral water. Sufficient quantity of the soap system can be added to form positive nonsimple liquids without the addition of caustic except where (1) the water has a pH less than about 7, and (2) the solution must have a pH greater than about 8.5 to be a positive nonsimple liquid. Under such conditions, the water may not dissolve enough of the alkaline soap system to raise the pH the required amount. In any event, the pH of the soap solution is more easily and economically adjusted to the desired range by adding caustic rather than by adding extra quantities of the alkaline soap. By caustic is meant the alkali metal hydroxides or carbonates. Preferably, sodium hydroxide or sodium carbonate is employed. Suitable caustic also includes ammonium hydroxide, $NH_4OH$, although it causes an ion exchange as described below. Sodium carbonate is particularly useful because it tends to give a buffered pH in the desired range even when used in excess of the required amount.

Each embodiment hereinafter is described in terms of "sufficient" caustic to give a desired pH range. It will be understood, however, that caustic will not be required if the pH of the solution resulting from admixture of the water and the compound $(X)(A)$ is within the range desired. On the other hand, as indicated above, the addition of caustic is preferred from the standpoint of economy.

In general, the soap systems are susceptible to ion exchange and possible precipitation with divalent ions, such as calcium or magnesium, when in contact therewith. Hence, in using these systems, it is preferable to flow a ring of water in advance of the treated flooding water. The ring of water will build up a bank and miscibly displace the solution in the formation containing the divalent ions, thus reducing the tendency to precipitate the divalent soaps. As an additional safeguard, a chelating or sequestering agent, such as tetrasodium salt of ethylene diamine tetraacetic acid, sold commercially as sodium Versenate, or sodium phosphate glass, commonly called sodium hexametaphosphate and sold commercially as Calgon, can be added to the solution containing the soap system in an amount from 0.1 to 1.5 percent by weight to chelate the divalent ions, particularly calcium. Higher percentages of agent may be used in the absence of sodium chloride. More than 1.5 percent by weight of the agent should be avoided where relatively high percentages, e.g., 3.5 to 5 percent by weight, of sodium chloride are present since the resulting flooding liquid is not a positive nonsimple liquid, nor does it exhibit the property of shear hardening. Alternatively, the chelating or sequestering agent may be added to the water injected into the formation ahead of the positive nonsimple liquid.

Figure 6:
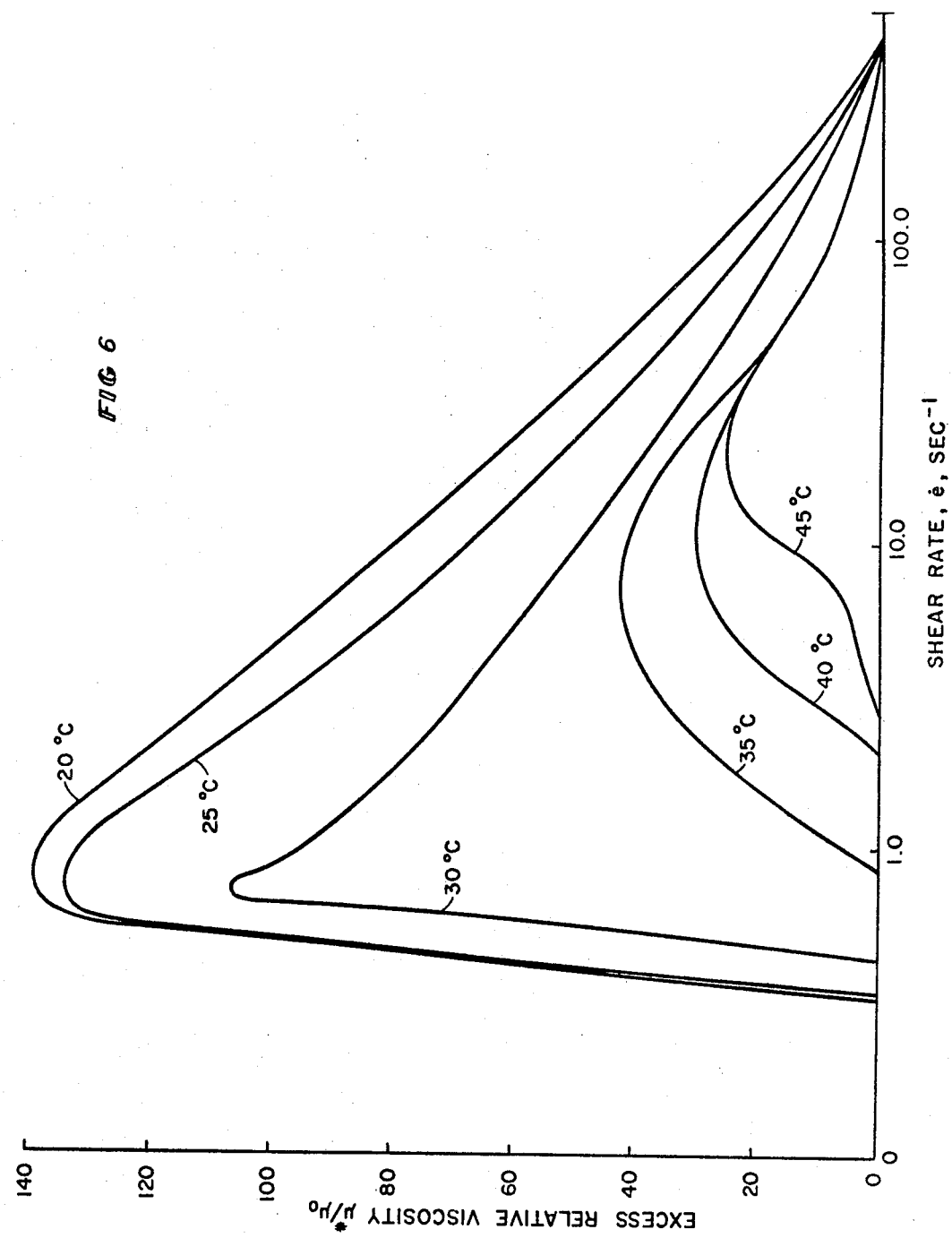
FIGURE 6 is a plot of the excess relative viscosity of a $V_2$-ranked aqueous positive nonsimple liquid as a function of shear rate at various temperatures.
Figure 7:
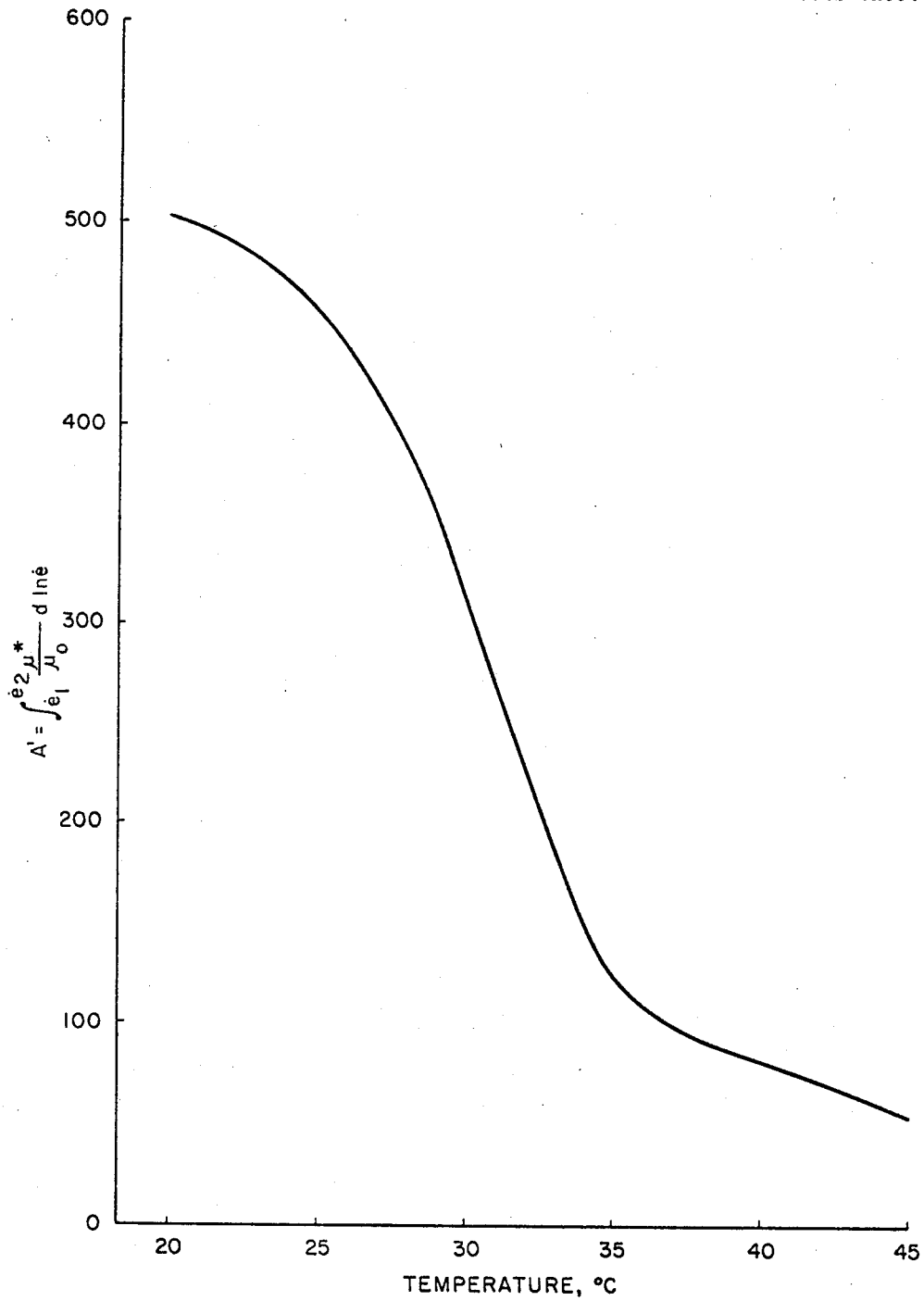
FIGURE 7 is a plot of the activity index, $A'$, defined below, as a function of temperature for a $V_2$-ranked liquid.

The efficacy of the positive nonsimple liquid formed by the aqueous solution is very much dependent on the temperature and pH of the solution and its environment. The temperature of the formation is a dominant factor in the selection of the positive nonsimple liquid to be used as flooding liquid. A typical temperature effect can be seen in FIGURE 6. Therein, the excess relative viscosity of a system for use in the invention, as hereinafter more fully disclosed, is plotted against shear rate at various temperatures. This system provides a particularly effective positive nonsimple liquid as can be seen from the value of the integral plotted as the activity index, A', in FIGURE 7. By knowing the reservoir temperature and selecting a particular additive system whose optimum response is at that temperature, its efficacy can be vastly improved, as illustrated in FIGURE 7. Therein, the activity index of the particular fluid is about 500 at 20° C. while it is down to approximately 50 at 45° C. The lower the temperature, the more effective will be the positive nonsimple liquid unless the additive will precipitate from the solution. Such precipitation can be observed, first, by the solution becoming opalescent and, subsequently, by the actual formation of the precipitate. The temperature is included in the following tables showing the efficacy of the various additives in aqueous solutions.

Figure 8:
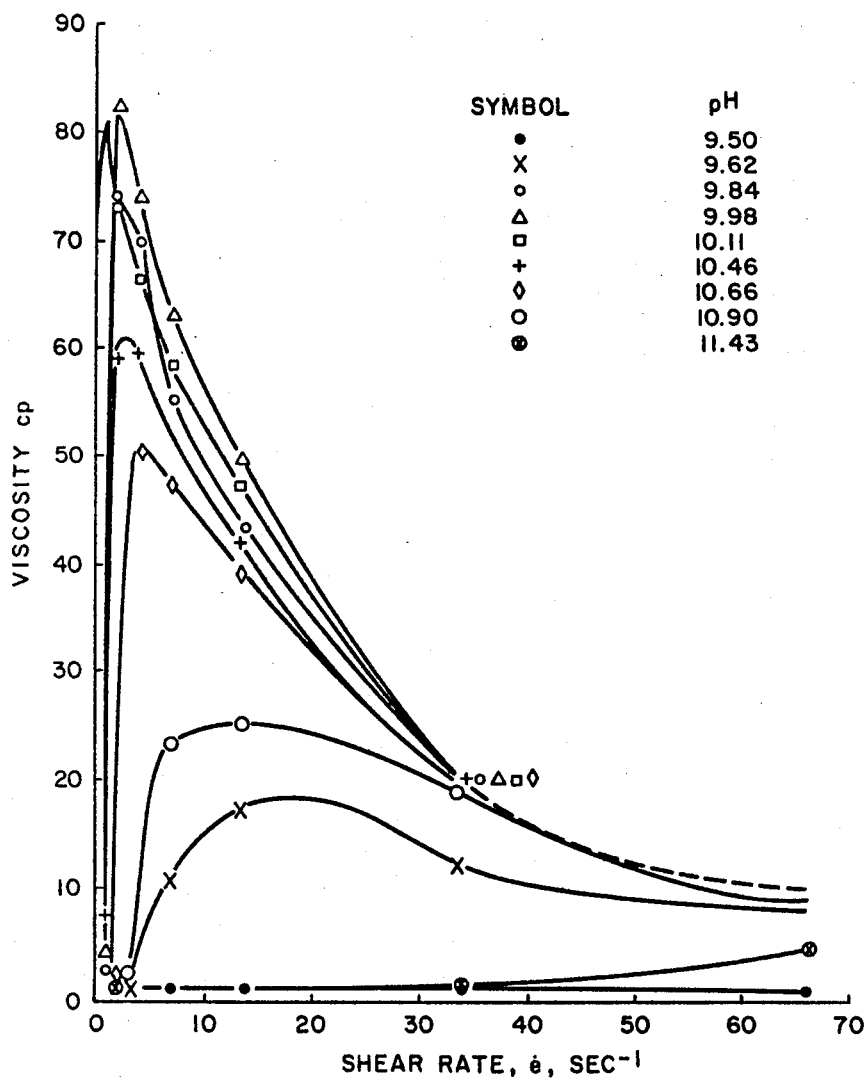
FIGURE 8 is a plot of viscosity response of a positive nonsimple liquid as a function of shear rate at different pH values.

As mentioned, the pH within the formation, and its soluble salts, also influence the selection of the positive nonsimple liquid. A typical case of optimizing the pH response for an additive to be used in an aqueuos solution is shown in FIGURE 8. In each embodiment hereafter described, a range of pH is given. An optimum pH will exist near the center of the range except as noted. The efficacy of the additive, both for inducing the characteristics of positive nonsimplicity and shear hardening and for improving the recovery of oil, is greatly improved at this optimum pH. The viscosity response of one of these typical aqueous positive nonsimple liquids to varying rates of shear at various pH's is shown in FIGURE 8. The particular solution was another system for use in the invention as more fully disclosed hereinafter. Varying amounts of sodium hydroxide were added to different portions of this solution; and the above-described Brookfield Synchro-Lectric Viscometer, Model LVT, was used to measure the viscosity response. The area under the curve in FIGURE 8 does not measure exactly the same integral as the previously described area A' in FIGURE 3. However, it is closely analogous. At the optimum pH the area is very considerably increased and the effectiveness of the positive nonsimple liquid is equally increased at this optimum pH when used to displace oil from a stratified subsurface formation.

Figure 9:
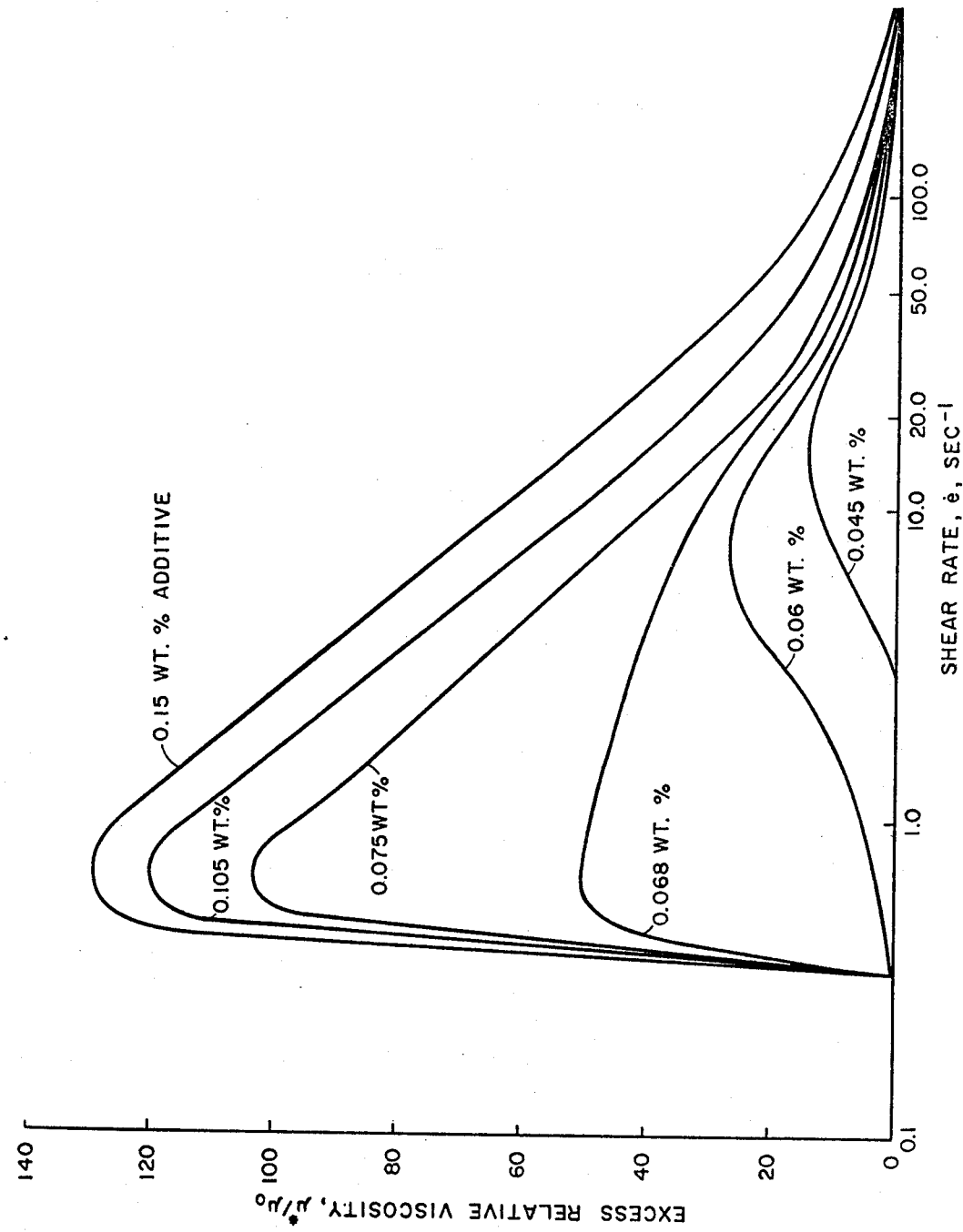
FIGURE 9 is a plot of the excess relative viscosity of an aqueous positive nonsimple liquid at different additive concentrations as a function of shear rate.
Figure 10:
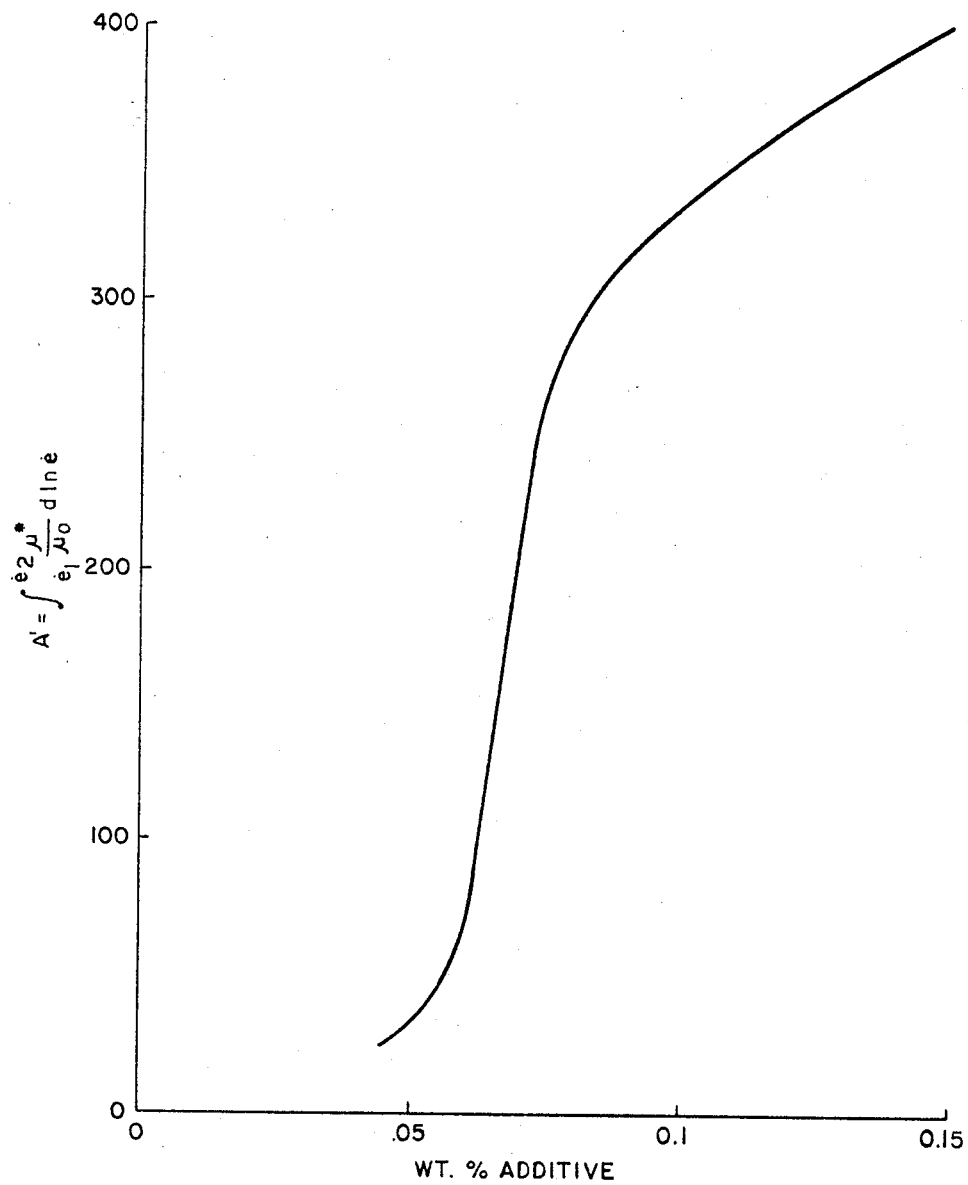
FIGURE 10 is a plot of the activity index, $A'$, of an aqueous positive nonsimple liquid as a function of additive concentration.

The concentration of the additive can also be varied to tailor a positive nonsimple liquid which is optimum for the particular subterranean formation. In general, the greater the concentration, the more active will be the resulting positive nonsimple liquid. This can be seen in FIGURE 9 wherein the excess relative viscosity of a positive nonsimple liquid is plotted versus the shear rate at different concentrations of the additive. FIGURE 10 shows the activity index, A', versus the weight percent of the additive in the positive nonsimple liquid. The activity index, A', increases from approximately 25 at 0.045 percent to approximately 400 at 0.15 percent. Increasing the concentration increases the viscosity.

In one embodiment of the invention, a positive nonsimple liquid is created by forming a dilute aqueous solution having therein an effective concentration of from 0.1 to 1 percent by weight sodium oleate and 1 to 5 percent by weight sodium chloride. The solution may also contain sufficient caustic to give a pH between 7.5 and 12. Sodium hydroxide can be added to the floodwater along with the sodium oleate in amounts up to about 0.5 weight percent. Sodium oleate with sodium chloride alone is alkaline; and for certain formations, water with these additives may be used without the addition of caustic.

A listing of systems which are positive nonsimple liquids, i.e., have the property of internal flow control and shear hardening, is given in Table II. When "percent" is used in any table, it refers to weight percent.

As illustrated in Table II, the upper temperature limit at which the aqueous solution is a positive nonsimple liquid can be extended by increasing the amount of sodium chloride in the aqueous solution. For example, in System 1, the range of maximum temperatures which can be encountered in the formation and still give the improved oil recovery lies between 25° and 50° C. with an optimum temperature being about 30° C. If the amount of sodium chloride is increased from 1 to 3 percent as shown by System 3, the range of maximum temperature of the formation is extended from 83° to about 88° C., with an optimum of about 84° C. The temperatures given in Table II are ranges of maximum temperatures. At lower temperatures such as found in formations, the solution remains active. Tailoring a specific waterflood additive for a specific formation can be accomplished. For example, in System 8, a 1 percent sodium oleate is added along with 4.5 weight percent sodium chloride and about 0.05 weight percent sodium hydroxide to give a positive nonsimple liquid useful as a flooding liquid up to a maximum temperature range of from 76° to 91° C.

TABLE II

| System No. | Water, Wt. Percent | Sodium Oleate, Wt. Percent | Sodium Chloride, Wt. Percent | Sodium Hydroxide, Wt. Percent | Temperature Range, ° C. | Optimum Temperature, ° C. |
|---|---|---|---|---|---|---|
| 1 | 98 | 1 | 1 | 0 | 25–50 | 30 |
| 2 | 97 | 1 | 2 | 0 | 28–63 | 40 |
| 3 | 96 | 1 | 3 | 0 | 83–88 | 84 |
| 4 | 98 | 1 | 1 | 0.05 | 20–25 | 20 |
| 5 | 97 | 1 | 2 | 0.05 | 25–51 | 32 |
| 6 | 96 | 1 | 3 | 0.05 | 30–75 | 45 |
| 7 | 95 | 1 | 4 | 0.05 | 44–89 | 50 |
| 8 | 94.5 | 1 | 4.5 | 0.05 | 76–91 | 80 |
| 9 | 98 | 1 | 1 | 0.10 | 25–40 | 30 |
| 10 | 97 | 1 | 2 | 0.10 | 25–49 | 40 |
| 11 | 96 | 1 | 3 | 0.10 | 30–75 | 50 |
| 12 | 95.5 | 1 | 3.5 | 0.10 | 40–85 | 70 |
| 13 | 95 | 1 | 4 | 0.10 | 50–89 | 75 |
| 14 | 98 | 0.2 | 1.8 | 0.05 | 25–37 | 27 |
| 15 | 97.7 | 0.2 | 2 | 0.10 | 25–43 | 35 |
| 16 | 96.6 | 0.2 | 3 | 0.10 | 30–60 | 30 |
| 17 | 97.5 | 0.1 | 2 | 0.40 | 29–50 | 30 |

TABLE III.—SODIUM OLEATE SYSTEMS

| System No. | Na Oleate, Wt. Percent | NaOH, Wt. Percent | NaCl, Wt. Percent | Na Versenate, Wt. Percent | Mols Na+ / Mols Na Oleate | T., °C. | Rank |
|---|---|---|---|---|---|---|---|
| 18 | 1.0 | 0 | 2.01 | 0 | 10.5 | 29 | $V_3$ |
| 18a | 1.0 | 0 | 2.01 | 0 | 10.5 | 55 | V |
| 19 | 1.0 | 0 | 3.01 | 0 | 15.7 | 83 | V |
| 20 | 0.1 | 0.429 | 2.01 | 0 | 137.1 | 29 | $V_2$ |
| 21 | 0.2 | 0.102 | 3.02 | 0 | 82.5 | 30 | V |
| 22 | 0.2 | 0.102 | 4.02 | 0 | 108.5 | 51 | X |
| 23 | 0.2 | 0.858 | 4.02 | 0 | 137.3 | 75 | X |
| 24 | 0.5 | 0.766 | 3.00 | 0 | 42.9 | 61 | V |
| 25 | 0.5 | 0.766 | 3.56 | 0 | 48.7 | 80 | M |
| 26 | 0.79 | 0.766 | 3.56 | 0 | 30.8 | 60 | M |
| 27 | 1.0 | 0.05 | 3.04 | 0 | 16.2 | 30 | $V_3$ |
| 28 | 1.0 | 0.05 | 4.01 | 0 | 21.3 | 44 | $V_2$ |
| 29 | 1.0 | 0.05 | 4.52 | 0 | 23.9 | 76 | $V_2$ |
| 30 | 1.0 | 0.106 | 3.01 | 0 | 16.5 | 30 | $V_3$ |
| 31 | 1.0 | 0.106 | 3.50 | 0 | 19.0 | 40 | $V_3$ |
| 32 | 1.0 | 0.106 | 4.02 | 0 | 21.7 | 50 | $V_3$ |
| 33 | 1.1 | 0.766 | 3.56 | 0 | 22.1 | 85 | M |
| 34 | 1.0 | 0.10 | 3.01 | 0.99 | 17.5 | 33 | $V_3$ |
| 35 | 1.0 | 0.10 | 3.01 | 1.51 | 18.0 | 34 | $V_3$ |
| 36 | 1.0 | 0.66 | 3.01 | 1.51 | 22.3 | 80 | V |
| 37 | 1.0 | 0.66 | 3.49 | 1.51 | 24.8 | 91 | X |

The foregoing is illustrated in Table III. Therein, Systems 22, 23, and 37 are not active, primarily because of high salt content. Elevated temperatures are necessary where the salt content is so high. However, System 18 illustrates the decrease in efficacy of a particular system as the temperature increases above the minimum necessary to achieve an active solution. It decreased from $V_3$ to V as the temperature increased from 29° to 55° C. A factor of significance in these sodium oleate systems is the mol ratio of the sodium ions Na+ to the sodium oleate present. This is shown in Table III. As the mols of sodium per mol of sodium oleate increase, the upper limit of temperature at which the sodium oleate solution is a positive nonsimple liquid decreases.

Ammonium ions can be added to these dilute solutions of sodium oleate to effect a conversion to ammonium oleate systems which are described in more detail later. This conversion is set forth in Table IV. System 40, for example, is not a positive nonsimple liquid, while System 41 is very effective. The difference is simply an additional 0.08 percent ammonia in the System 41. To obtain precision, the ammonia which is reported herein was added in aqueous solution.

Referring to Table IV, some solutions are referred to as "opal," meaning they are opalescent. The opalescent solutions can be used in the more permeable formations. In relatively impermeable formations, the opalescent solutions are not desirable because of their tendency to filter out. It is preferred to use solutions which are clear in flooding subterranean formations. Of course, a solution containing a precipitate is undesirable since it tends to plug all but the most permeable strata.

TABLE IV.—SODIUM OLEATE—$NH_3$—$NH_4Cl$ SYSTEMS

| System No. | Na Oleate, Wt. percent | $NH_3$, Wt. percent | $NH_4Cl$, Wt. percent | Mols $NH_4Cl$ / Mols Na Oleate | Rank | pH | Description |
|---|---|---|---|---|---|---|---|
| 38 | 0.1 | 0 | 0.02 | 1.06 | X | 7 | Opal. |
| 39 | 0.1 | 0.016 | 0.02 | 1.06 | X | 7.5 | Do. |
| 40 | 0.1 | 0.062 | 0.02 | 1.06 | X | 8 | Do. |
| 41 | 0.1 | 0.14 | 0.02 | 1.06 | $V_2$ | 10 | Clear. |
| 42 | 0.14 | 0.259 | 0 | 0 | X | 10.5 | Do. |
| 43 | 0.14 | 0.259 | 0.025 | 1.0 | M | 10 | Do. |
| 44 | 0.14 | 0.259 | 0.05 | 2.0 | V | 9.5 | Do. |
| 45 | 0.14 | 0.51 | 0.05 | 2.0 | V | 10.5 | Do. |
| 46 | 0.14 | 0.51 | 0.221 | 8.84 | V | 10 | Opal. |
| 47 | 0.14 | 0.613 | 0.221 | 8.84 | M | 10.5 | Do. |
| 48 | 0.14 | 0.729 | 0.221 | 8.84 | $V_2$ | 10.5 | Do. |

No. 46: V to M in 5 days.

In another embodiment of the invention, a positive nonsimple liquid is created by forming a dilute aqueous solution having therein an effective concentration of from 0.05 to 1 percent by weight potassium oleate and 2 to 5 percent by weight or more potassium chloride. The solution may also contain sufficient caustic to give a pH greater than 7 and less than 13.

TABLE V.—POTASSIUM OLEATE SYSTEMS

| System No. | Water, Wt. Percent | Potassium Oleate, Wt. Percent | Potassium Hydroxide, Wt. Percent | Potassium Chloride, Wt. Percent | Temp.,* °C. | Rank |
|---|---|---|---|---|---|---|
| 49 | 97.2 | 0.2 | 0.05 | 2.6 | 25–30 | S |
| 50 | 96.7 | 0.2 | 0.05 | 3.1 | 25–30 | M |
| 51 | 95.4 | 0.2 | 0.05 | 4.4 | 25–30 | V |
| 52 | 94.8 | 0.2 | 0.05 | 5.0 | 25–30 | $V_2$ |

*Upper temperature limit of "activity" not determined.

TABLE VI.—POTASSIUM OLEATE SYSTEMS AT 25° C.

| System No. | K Oleate, wt. percent | KOH, wt. percent | KCl, wt. percent | Rank | pH | Description |
|---|---|---|---|---|---|---|
| 53 | 0.81 | 2.10 | --- | X | 11 | Clear. |
| 54 | 1.53 | 1.98 | --- | X | 11 | Do. |
| 55 | 3.09 | 1.70 | --- | X | 11 | Do. |
| 56 | 5.12 | 1.35 | --- | X | 11 | Do. |
| 57 | 4.54 | 0.58 | --- | X | 11 | Do. |
| 58 | 4.52 | 1.00 | --- | X | 11 | Do. |
| 59 | 4.55 | 1.08 | --- | X | 11 | Do. |
| 60 | 4.55 | 1.13 | --- | X | 11 | Do. |
| 61 | 4.54 | 1.20 | --- | X | 11 | Do. |
| 62 | 4.53 | 1.25 | --- | X | 11 | Do. |
| 63 | 4.50 | 1.41 | --- | X | 11 | Do. |
| 64 | 0.2 | 0.05 | 2.6 | S | 9 | Do. |
| 65 | 0.2 | 0.05 | 3.1 | M | 9 | Do. |
| 66 | 0.2 | 0.05 | 4.4 | V | 9 | Do. |
| 67 | 0.2 | 0.05 | 5.0 | $V_2$ | 9 | Clear, viscous. |

No. 67: $V_2$ to S, 8 days old.

Table V illustrates that increasing amounts of potassium chloride in the alkaline potassium oleate solution achieves better recovery. Table VI shows other systems which are relatively ineffective in increasing the recovery of oil over that of waterflood, as shown by rank of X.

In another embodiment of the invention, a positive nonsimple liquid is created by forming a dilute aqueous solution having therein an effective concentration of from 0.001 to 1 percent by weight, preferably 0.01 to 0.1 percent by weight, sodium palmitate or sodium stearate, and 0.5 to 5 percent by weight sodium chloride. The solution may also contain sufficient caustic to give a pH above 7.

Table VII illustrates in Systems 68 through 72 concentrations of sodium palmitate, sodium chloride, and sodium hydroxide which will create an aqueous solution which will have the desired properties up to a relatively high temperature, e.g., 75° C. or higher. Table VII also shows other systems and their respective rank. The temperatures set forth in Table VII are the minimum temperatures at which the solutions become clear. The sodium stearate systems are equally as effective as, and behave in a manner very similar to, the sodium palmitate systems.

solution having therein an effective concentration of from 0.001 to 1 percent by weight, preferably 0.01 to 0.1 percent by weight, ammonium stearate or ammonium palmitate and an excess of ammonium ion. By excess ammonium ion is meant $NH_4^+$ in addition to ammonium soap added. To achieve the excess ammonium ion, ammonia or ammonium hydroxide in an amount from 0.05 to 0.4 percent by weight is added. Table VIII illustrates that the ammonium palmitate systems achieve activity without the presence of ammonium chloride or sodium chloride, although the presence of these salts does not diminish the activity obtainable therewith.

The ammonium stearate systems are summarized in Table IX. The sodium chloride ion will extend the maximum operable temperature, hence the commonly available oil field flooding brines extend the range of usefulness.

When using ammonium palmitate or ammonium stearate, it is imperative that an excess of ammonium ions be present. Moreover, the precautions described in connection with the positive nonsimple sodium oleate systems should be observed with the positive nonsimple ammonium palmitate or ammonium stearate systems in formations containing divalent ions.

TABLE VII.—SODIUM PALMITATE SYSTEMS

| System No. | Na Palmitate, Wt. Percent | NaOH, Wt. Percent | NaCl, Wt. Percent | Na Versenate, Wt. Percent | T.,* ° C. | Rank | pH | Description |
|---|---|---|---|---|---|---|---|---|
| 68 | 0.48 | 0.97 | 1.51 | 0 | 75–76 | | | |
| 69 | 0.48 | 0.97 | 2.0 | 0 | 76–79 | | | |
| 70 | 0.48 | 0.97 | 2.5 | 0 | 78–88 | | | |
| 71 | 1.0 | 0.12 | 2.5 | 0 | 75–77 | | | |
| 72 | 0.6 | 0.6 | 2.5 | 2 | 85–86 | | | |
| 73 | 0.24 | 0.072 | | | 63 | X | 10.5 | Clear. |
| 74 | 0.24 | 0.072 | 0.5 | | 64 | X | 10.5 | Do. |
| 75 | 0.24 | 0.072 | 5.0 | | 90 | X | 10.5 | Do. |
| 76 | 0.11 | 0.034 | 2.5 | | 73 | X | 10.5 | Do. |
| 77 | 0.2 | 0.72 | | | 68 | X | 11 | Do. |
| 78 | 0.2 | 3.6 | | | 78 | X | 11 | Do. |
| 79 | 1.0 | 0.12 | | | 66 | X | 10.5 | Do. |
| 80 | 1.0 | 0.12 | 1.0 | | 70 | X | 10.5 | Do. |
| 81 | 1.0 | 0.12 | 2.0 | | 72 | X | 10.5 | Do. |
| 82 | 1.0 | 0.12 | 2.5 | | 75 | M | 10.5 | Do. |
| | | | | | 77 | S | | Do. |
| 83 | 1.0 | 0.50 | 3.0 | | 78 | S | 11 | Do. |
| 84 | 1.0 | 0.25 | 3.0 | | 78 | S | 11 | Do. |
| 85 | 0.48 | 0.25 | 1.5 | | 70 | X | 11 | Do. |
| 86 | 0.48 | 0.97 | 1.5 | | 75 | M | 11 | Do. |
| 87 | 0.48 | 0.97 | 2.0 | | 75.5 | M | 11 | Do. |
| | | | | | 78 | M | | Do. |
| 88 | 0.48 | 0.97 | 2.5 | | 78 | V | 11 | Do. |
| | | | | | 88 | S | | Do. |
| 89 | 0.48 | 0.97 | 3.0 | | 98 | X | 11 | Do. |
| 90 | 0.12 | | 0.5 | 2.0 | 68 | X | 9 | Do. |
| 91 | 0.12 | | 2.4 | 2.0 | 74 | X | 9 | Do. |
| 92 | 0.61 | | 2.4 | 2.0 | 98 | X | 9 | Do. |
| 93 | 0.61 | 0.68 | 2.4 | 2.0 | 85 | V | 11 | Do. |

*Soap not dispensed at 25° C., minimum T for dispersion is initial value listed.

In another embodiment of the invention, a positive nonsimple liquid is created by forming a dilute aqueous

TABLE VIII.—AMMONIUM PALMITATE SYSTEMS

| System No. | $NH_4$ Palmitate, Wt. percent | Ammonia,* Wt. percent | $NH_4Cl$, Wt. percent | NaCl, Wt. percent | Operable Temp. Range, ° C. | Optimum Temp., ° C. | Rank |
|---|---|---|---|---|---|---|---|
| 94 | 0.02 | 0.98 | 0 | 0 | 40–42 | 41 | S |
| 95 | 0.02 | 1.23 | 0 | 0 | 42–44 | 42 | M |
| 96 | 0.02 | 1.62 | 0 | 0 | 39–60 | 45 | $V_2$ |
| 97 | 0.02 | 2.12 | 0 | 0 | 38–58 | 42 | $V_2$ |
| 98 | 0.02 | 2.57 | 0 | 0 | 38–52 | 39 | $V_2$ |
| 99 | 0.02 | 3.93 | 0 | 0 | 37–53 | 38 | $V_2$ |
| 100 | 0.12 | 0.98 | 0 | 0 | 45–50 | 45 | $V_2$ |
| 101 | 0.12 | 3.93 | 0 | 0 | 47–48 | 47 | S |
| 102 | 0.21 | 1.27 | 0 | 0 | 44–47 | 44 | V |
| 103 | 0.02 | 0.98 | 0.2 | 0 | 45–58 | 46 | $V_2$ |
| 104 | 0.10 | 2.63 | 0.5 | 0 | 35–63 | 48 | $V_3$ |
| 105 | 0.02 | 0.98 | 0.2 | 0.5 | 49–58 | 49 | $V_2$ |
| 106 | 0.02 | 0.98 | 0.2 | 1.0 | 54–57 | 54 | S |
| 107 | 0.02 | 0.98 | 0.38 | 0.5 | 43–52 | 44 | V |
| 108 | 0.12 | 3.93 | 0 | 1.0 | | | X |

*From ammonium hydroxide reagent of specific gravity of 0.89 and containing 29% ammonia.

TABLE IX.—AMMONIUM STEARATE SYSTEMS

| System No. | NH₄ Stearate, Wt. Percent | NH₃*, Wt. Percent | NaCl, Wt. Percent | T., °C | Rank | pH | Description |
|---|---|---|---|---|---|---|---|
| 109 | 0.15 | 1.28 |  | 25 | X | 10.5 | Precipitate. |
|  |  |  |  | 45 | V₂ |  | Clear. |
|  |  |  |  | 50 | V |  | Do. |
|  |  |  |  | 55 | S |  | Do. |
| 110 | 0.15 | 1.28 | 1.0 | 25 | X | 10.5 | Precipitate. |
|  |  |  |  | 53 | V |  | Clear. |
|  |  |  |  | 55 | S |  | Do. |
| 111 | 0.15 | 1.28 | 2.0 | 25 | X |  | Precipitate. |
|  |  |  |  | 67 | M |  | Clear. |
|  |  |  |  | 68 | S |  | Do. |

* From NH₄OH of specific gravity of 0.89 and containing 29% ammonia.

In another embodiment of the invention, a positive nonsimple liquid is created by forming a dilute aqueous solution having therein an effective concentration of from 0.05 to 0.5 percent by weight ammonium elaidate and an excess of ammonium ion, e.g., 0.1 to 1 percent by weight ammonium hydroxide. A concentration of 0.15 percent ammonium elaidate with 0.5 percent excess ammonium ion will give a positive nonsimple liquid in the range of from 31° to 50° C. with the optimum at about 43° C. The optimum pH for the ammonium elaidate additive is approximately 10. It must be on the alkaline side, i.e., have a pH greater than 7.

In another embodiment of the invention, a positive nonsimple liquid is created by forming a dilute aqueous solution having therein an effective concentration of from 0.1 to 0.5 percent by weight ammonium oleate and ammonium hydroxide. Sufficient ammonium hydroxide may be employed to obtain a solution having a pH between about 9.5 and 11. Alternatively, sodium carbonate may be employed along with the ammonium hydroxide to obtain the desired pH. In this case, the sodium carbonate reduces the amount of ammonium hydroxide required. Also, the sodium carbonate is useful in affording a buffered pH in the desired range for these ammonim oleate solutions and thus tends to maintain the given pH even in the presence of adverse environment.

The ammonuim oleate and excess ammonium hydroxide systems are particularly effective and preferred because they are easy to use under their optimum conditions. Increasing the concentration of ammonium oelate above approximately 0.12 percent by weight does not increase oil recovery as much as similar increases below that concentration.

The ammonium oleate solution having a concentration of 0.28 percent ammonium oleate, 1.25 percent NH₄OH, and a pH of 10.5 was used in the previously described example wherein the oil saturation was reduced to 53 percent, achieving an oleate solution-oil ratio of only 21 whereas a water-oil ratio of 61 was necessary to achieve the same reduction in residual oil.

The properties of an ammonium oleate-ammonia system are summarized in Table X. The pH of the solution must be about 10 before the ammonium oleate-ammonia solutions become positive nonsimple liquids. The pH must be about 10.5 before all of the ammonium oleate is dissolved. Hence, some of these systems have to be filtered before being used in most subterranean formations. Increasing the ratio of mols of ammonia to mols of ammonium oleate within a range of about fiftyfold increases the efficacy of the resulting positive nonsimple liquid. Because of the low dissociation constant, the mols of ammonium ion to ammonium oleate increases only about sevenfold. The data in Table X also indicates that a decreasing amount of excess ammonium ion is necessary to produce a positive nonsimple fluid as the concentration of ammonium oleate increases.

TABLE X.—AMMONIUM OLEATE, AMMONIA SYSTEMS

| System No. | NH₄ Oleate, Wt. percent | NH₃, Wt. percent | Mols NH₃ / Mols NH₄ Oleate | Mols NH₄⁺ / Mols NH₄ Oleate | Rank | pH | Description |
|---|---|---|---|---|---|---|---|
| 112 | 0.10 | 0.0046 | 0.84 | 0.086 | X | 7.5 | Precipitate. |
| 113 | 0.104 | 0.097 | 17.4 | 0.378 | X | 10 | Do. |
| 114 | 0.104 | 0.159 | 27.5 | 0.483 | M | 10.5 | Opal. |
| 115 | 0.104 | 0.173 | 29.8 | 0.505 | M | 10.5 | Do. |
| 116 | 0.104 | 0.201 | 34.7 | 0.541 | S | 10.5 | Do. |
| 117 | 0.104 | 0.237 | 40.9 | 0.590 | V₂ | 10.5 | Clear. |
| 118 | 0.104 | 0.275 | 47.0 | 0.636 | V₂ | 10.5 | Do. |
| 119 | 0.104 | 0.276 | 47.7 | 0.637 | V₂ | 10.5 | Do. |
| 120 | 0.227 | 0.018 | 1.4 | 0.061 | X | 8 | Precipitate. |
| 121 | 0.227 | 0.07 | 5.4 | 0.121 | X | 8.5 | Do. |
| 122 | 0.227 | 0.184 | 14.2 | 0.195 | M | 9 | Do. |
| 123 | 0.227 | 0.269 | 20.8 | 0.236 | V | 10.5 | Clear. |
| 124 | 0.227 | 1.29 | 100.0 | 0.517 | V₂ | 10.5 | Do. |
| 125 | 0.227 | 2.59 | 200.0 | 0.733 | V₂ | 11 | Do. |
| 126 | 0.455 | 0.026 | 1.0 | 0.059 | X | 8.5 | Precipitate. |
| 127 | 0.455 | 0.46 | 17.8 | 0.249 | V₃ | 10 | Clear. |
| 128 | 0.9 | 3.17 | 61.9 | 0.250 | V₁ | 10.5 | Opal. |
| 129 | 1.0 | 0.24 | 4.2 | 0.062 | V₃ | 10 | Do. |

The data in Table XI illustrates that relatively large quantities of salt may be present in an ammonium oleate-ammonia-sodium chloride system without loss of activity. In fact, the sodium chloride within limits increases the efficacy of the ammonium oleate-ammonia system. Less ammonia is required as the concentration of sodium chloride is increased; therefore, reactivity can be obtained at a lower pH. Table XII shows an increasing efficacy with increasing temperatures in the presence of sodium chloride.

Table XIII illustrates the effect of temperature. System 140 at 25° C. does not increase the oil recovery above that of water by any significant amount. At 48° C., however, it is very highly effective. It is still very effective at 56° C., and slightly effective at 60° C. This is typical of the behavior of these systems. The compositions of the systems can be varied to obtain a very large temperature range wherein the liquids will remain positive nonsimple liquids and effective in the method of the invention.

TABLE XI.—AMMONIUM OLEATE, AMMONIA, SODIUM CHLORIDE SYSTEMS

| System No. | NH₄ Oleate, Wt. percent | NH₃, Wt. percent | NaCl, Wt. percent | Mols NH₃ / Mols NH₄ Oleate | Mols NH₄⁺ / Mols NH₄ Oleate | Rank | pH | Description |
|---|---|---|---|---|---|---|---|---|
| 130 | 0.1 | 0.0046 | 0.022 | 0.84 | 0.086 | X | 7.5 | Precipitate. |
| 131 | 0.104 | 0.159 |  | 27.5 | 0.483 | M | 10.5 | Opal. |
| 132 | 0.104 | 0.237 | 0.70 | 40.9 | 0.590 | M | 10.5 | Clear. |
| 133 | 0.104 | 0.237 | 1.10 | 40.9 | 0.590 | $V_2$ | 10.5 | Opal. |
| 134 | 0.104 | 0.237 | 1.33 | 40.9 | 0.590 | $V_2$ | 10.5 | Do. |
| 135 | 1.0 | 0.238 | 2.0 | 2.08 | 0.002 | $V_3$ | 10 | Clear, viscous. |
| 136 | 1.0 | 0.238 | 2.47 | 2.08 | 0.062 | M | 10 | Precipitate. |
| 137 | 1.02 | 0.32 | 2.46 | 5.51 | 0.070 | V | 10 | Do. |
| 138 | 1.0 | 0.499 | 2.47 | 8.77 | 0.089 | $V_3$ | 10.5 | Clear. |
| 139 | 1.0 | 1.45 | 2.47 | 25.5 | 0.152 | $V_3$ | 11 | Clear, viscous. |
| 140 | 0.9 | 3.17 |  | 61.9 | 0.250 | $V_3$ | 10.5 | Opal. |

TABLE XII.—AMMONIUM OLEATE, AMMONIA, SODIUM CHLORIDE SYSTEMS

| System No. | NH₄ Oleate, Wt. Percent | NH₃, Wt. Percent | Mols NH₄⁺ / Mols NH₄ Oleate | NaCl, Wt. Percent | pH | T., °C | Rank | Description |
|---|---|---|---|---|---|---|---|---|
| 129 | 1.0 | 0.24 | 0.062 | 0 | 10 | 25 | $V_3$ | Opal. |
|  |  |  |  |  |  | 35 | $V_2$ | Do. |
|  |  |  |  |  |  | 41 | S | Clear. |
| 135 | 1.0 | 0.238 | 0.062 | 2.0 | 10 | 25 | $V_3$ | Clear, viscous. |
|  |  |  |  |  |  | 50 | $V_2$ | Do. |
|  |  |  |  |  |  | 62 | S | Clear. |

TABLE XIII.—TEMPERATURE EFFECTS

| System No. | NH₄ Oleate, Wt. percent | NH₃, Wt. percent | NaCl, Wt. percent | T., °C | Rank | Description |
|---|---|---|---|---|---|---|
| 140 | 1.0 | 1.45 | 2.85 | 25 | X | Precipitate. |
|  |  |  |  | 48 | $V_3$ | Clear, viscous. |
|  |  |  |  | 56 | $V_2$ | Clear. |
|  |  |  |  | 60 | S | Do. |

Other ammonium oleate systems behave in the same general fashion illustrated by the foregoing data. An ammonium oleate system—0.15 percent by weight ammonium oleate and 0.52 percent by weight ammonia—was used in obtaining the data for FIGURE 3 and FIGURE 4. They remain active in complex systems as shown in Table XIV. The complex ammonium oleate systems are inactive at temperatures as low as 25° C. in the concentrations tested, but considerable activity may be shown up to as high as 70° C., decreasing somewhat but still useful even at 90° C.

neutralization product of the reaction between an amine, e.g., ethanolamine, and oleic acid in an alkaline environment. Other amines which may be used to neutralize oleic acid and produce amine oleates which are satisfactory are ethylamine, propylamine, diethylamine, dibutylamine, triethylamine, ethylenediamine, and diethylenetriamine. In general, the alkyl radicals of the amine contain from 1 to 6 carbon atoms. The amines are used in excess of the stoichiometric amount, thus giving a product which is alkaline in reaction. The amine oleates which may be used can be primary, secondary, or tertiary. For example, TABLE XIV.—AMMONIUM OLEATE-AMMONIA-AMMONIUM CHLORIDE-SODIUM CHLORIDE-SODIUM HYDROXIDE SYSTEMS

| System No. | NH₄ Oleate, Wt. percent | NH₃, Wt. percent | NH₄Cl, Wt. percent | NaCl, Wt. percent | NaOH, Wt. percent | T., °C | Rank | Description |
|---|---|---|---|---|---|---|---|---|
| 141 | 1.02 | 0.56 | 0.79 | 2.46 | 0.75 | 25 | X | Precipitate. |
|  |  |  |  |  |  | 36 | V | Viscous, clear. |
|  |  |  |  |  |  | 55 | V | Do. |
|  |  |  |  |  |  | 70 | M | Clear. |
|  |  |  |  |  |  | 85 | S | Do. |
|  |  |  |  |  |  | 90 | S | Do. |
| 142 | 1.0 | 3.17 | 0.2 | 2.47 | 0.14 | 25 | X | Precipitate. |
|  |  |  |  |  |  | 35 | X | Viscous, precipitate. |
|  |  |  |  |  |  | 40 | V | Clear, viscous. |
|  |  |  |  |  |  | 45 | V | Do. |
|  |  |  |  |  |  | 55 | V | Do. |
|  |  |  |  |  |  | 65 | V | Clear. |
|  |  |  |  |  |  | 70 | S | Do. |

In another embodiment of the invention, a positive nonsimple liquid is created by forming a dilute aqueous solution having therein an effective concentration of from 0.01 to 5 percent amine oleates or alkanol amine oleates. These amines are often called substituted ammonium compounds. The resulting binary system is very easy to use as a flooding liquid and is a particularly effective and preferred flooding liquid. A typical amine oleate is the secondary butylamine oleate, often called secondary butyl ammonium oleate, is an effective additive. Table XVI summarizes the properties of a secondary butylamine oleate solution. The presence or absence of sodium chloride appears to have very little effect on the solution. In higher concentrations, it appears to extend the maximum temperatures which the solution can tolerate and remain active.

TABLE XV.—SEC-BUTYLAMINE (s-BA) OLEATE SYSTEMS, TEMPERATURE VARIATION

| System No. | s-BA Oleate, Wt. Percent | KOH, Wt. Percent | NaCl, Wt. Percent | NaOH, Wt. Percent | Na Versenate, Wt. Percent | Ca⁺⁺ Wt. Percent | T., °C | Rank | pH | Description |
|---|---|---|---|---|---|---|---|---|---|---|
| 154 | 0.04 | 0.015 |  |  |  |  | 25 | $V_2$ | 9 | Clear. |
| 155 | 0.04 | 0.03 |  |  |  |  | 25 | M | 9.5 | Do. |
| 156 | 0.06 | 0.03 |  |  |  |  | 25 | V | 9.5 | Do. |
| 157 | 0.17 | 0.015 |  |  |  |  | 25 | $V_2$ | 9 | Do. |
|  |  |  |  |  |  |  | 48 | V | 9 |  |
|  |  |  |  |  |  |  | 51 | S | 9 |  |
| 158 | 0.44 |  |  |  |  |  | 25 | $V_3$ | 9 | Murky. |
|  |  |  |  |  |  |  | 40 | $V_2$ | 9 | Do. |
|  |  |  |  |  |  |  | 48 | V | 9 | Do. |
|  |  |  |  |  |  |  | 52 | S | 9 | Do. |
| 159 | 0.44 | 0.015 |  |  |  |  | 25 | $V_3$ |  | Clear. |
|  |  |  |  |  |  |  | 38 | $V_2$ |  | Do. |
|  |  |  |  |  |  |  | 45 | V |  | Do. |
|  |  |  |  |  |  |  | 47 | S |  | Do. |

TABLE XV.—SEC-BUTYLAMINE (s-BA) OLEATE SYSTEMS, TEMPERATURE VARIATION—Continued

| System No. | s-BA Oleate, Wt. Percent | KOH, Wt. Percent | NaCl, Wt. Percent | NaOH, Wt. Percent | Na Versenate, Wt. Percent | Ca++ * Wt. Percent | T., °C | Rank | pH | Description |
|---|---|---|---|---|---|---|---|---|---|---|
| 160 | 0.17 | 0.015 | 0.52 | | | | 25 | $V_2$ | 9 | Opal. |
| | | | | | | | 33 | S | | Clear. |
| 161 | 0.44 | | | 0.12 | | | 25 | X | 11 | Do. |
| | | | | | | | 22 | M | | Do. |
| 162 | 0.44 | | 1.03 | 0.12 | | | 25 | V | 11 | Do. |
| | | | | | | | 31 | M | | Do. |
| | | | | | | | 32 | S | | Do. |
| 163 | 0.44 | | 2.02 | 0.12 | | | 25 | $V_3$ | 11 | Do. |
| | | | | | | | 30 | V | | Do. |
| | | | | | | | 35 | S | | Do. |
| 164 | 0.44 | | 3.00 | 0.12 | | | 25 | X | 11 | Precipitate. |
| | | | | | | | 36 | V | | Clear. |
| | | | | | | | 44 | M | | |
| | | | | | | | 48 | S | | |
| 165 | 0.44 | | 3.00 | 0.28 | | | 25 | X | 11 | Precipitate. |
| | | | | | | | 28 | $V_3$ | | Clear. |
| | | | | | | | 41 | $V_2$ | | Do. |
| | | | | | | | 48 | V | | Do. |
| | | | | | | | 52 | S | | Do. |
| 166 | 0.44 | | 4.03 | 0.28 | | | 25 | X | 11 | Precipitate. |
| | | | | | | | 55 | S | | Clear. |
| 167 | 0.44 | | 4.03 | 0.36 | | | 25 | X | 11 | Precipitate. |
| | | | | | | | 50 | X | | Do. |
| | | | | | | | 60 | X | | Do. |
| 168 | 0.21 | | 2.01 | 0.27 | | | 25 | $V_2$ | 11 | Clear. |
| | | | | | | | 30 | V | | Do. |
| | | | | | | | 36 | S | | Do. |
| 169 | 0.21 | | 3.01 | 0.27 | | | 25 | X | 11 | Precipitate. |
| | | | | | | | 27 | $V_2$ | | Clear. |
| | | | | | | | 35 | M | | Do. |
| | | | | | | | 37 | S | | Do. |
| 170 | 0.21 | | 3.50 | 0.27 | | | 25 | X | 11 | Precipitate. |
| | | | | | | | 37 | S | | Clear. |
| 171 | 0.21 | | 3.50 | 0.44 | | | 25 | X | 11 | Precipitate. |
| | | | | | | | 39 | X | | Clear. |
| 172 | 0.21 | | 3.50 | 0.77 | | | 25 | X | 11 | Precipitate. |
| | | | | | | | 48 | X | | Clear. |
| 173 | 0.67 | | 3.50 | 0.77 | | | 25 | X | 11 | Precipitate. |
| | | | | | | | 48 | V | | Do. |
| | | | | | | | 50 | $V_2$ | | Clear. |
| | | | | | | | 53 | $V_2$ | | Do. |
| | | | | | | | 60 | V | | Do. |
| | | | | | | | 65 | M | | Do. |
| | | | | | | | 75 | S | | Do. |
| 174 | 0.67 | | 3.50 | 1.06 | | | 25 | X | 11 | Precipitate. |
| | | | | | | | 86 | X | | Clear. |
| 175 | 0.67 | | 4.02 | 1.06 | | | 25 | X | 11 | Precipitate. |
| | | | | | | | 98 | X | | Clear. |
| 176 | 0.17 | 0.015 | 0.52 | | 0.99 | | 25 | $V_2$ | 10 | Opal. |
| | | | | | | | 41 | $V_2$ | | Do. |
| | | | | | | | 44 | M | | Clear. |
| | | | | | | | 46 | S | | Do. |
| 177 | 0.17 | 0.015 | 1.02 | | 0.99 | | 25 | $V_2$ | 10 | Opal. |
| | | | | | | | 27 | $V_2$ | | Do. |
| | | | | | | | 33 | M | | Clear. |
| | | | | | | | 36 | S | | Do. |
| 178 | 0.17 | 0.015 | 1.02 | | 1.98 | | 25 | M | 10.5 | Cloudy. |
| | | | | | | | 35 | S | | Clear. |
| 179 | 0.17 | 0.015 | 1.02 | 0.69 | 1.98 | | 25 | V | 11 | Do. |
| | | | | | | | 28 | M | | Do. |
| | | | | | | | 30 | S | | Do. |
| 180 | 0.44 | | 1.0 | 0.66 | 1.02 | | 25 | $V_2$ | 11 | Do. |
| | | | | | | | 33 | V | | Do. |
| | | | | | | | 35 | M | | Do. |
| | | | | | | | 37 | S | | Do. |
| 181 | 0.44 | | 1.94 | 0.66 | 1.02 | | 25 | $V_3$ | 11 | Do. |
| | | | | | | | 41 | V | | Do. |
| | | | | | | | 45 | S | | Do. |
| 182 | 0.44 | | 2.97 | 0.66 | 1.02 | | 25 | X | 11 | Precipitate. |
| | | | | | | | 40 | V | | Clear. |
| | | | | | | | 47 | V | | Do. |
| | | | | | | | 55 | S | | Do. |
| 183 | 0.44 | | 4.0 | 0.66 | 1.02 | | 25 | X | 11 | Precipitate. |
| | | | | | | | 80 | X | | Clear. |
| 184 | 0.44 | | 4.0 | 0.66 | 2.02 | | 25 | X | 11 | Precipitate. |
| | | | | | | | 96 | X | 10 | Do. |
| 185 | 0.44 | | | | 0.46 | | 25 | $V_3$ | | Opal. |
| | | | | | | | 40 | $V_3$ | | Do. |
| | | | | | | | 50 | $V_2$ | | Clear. |
| | | | | | | | 55 | S | | Do. |
| 186 | 0.44 | | | | 0.92 | | 25 | $V_2$ | 10 | Opal. |
| | | | | | | | 46 | $V_2$ | | Do. |
| | | | | | | | 50 | V | | Clear. |
| | | | | | | | 53 | S | | Do. |
| 187 | 0.165 | 0.015 | | | 3.15 | | 25 | $V_2$ | 10 | Do. |
| 188 | 0.163 | 0.015 | | | 3.13 | 0.0656 | 25 | $V_2$ | 10 | Do. |
| 189 | 0.161 | 0.015 | | | 3.09 | 0.160 | 25 | S | 10 | Cloudy. |
| 190 | 0.162 | 0.015 | | | 2.75 | 0.135 | 25 | M | 10 | Clear. |
| 191 | 0.163 | 0.015 | | | 2.49 | 0.122 | 25 | V | 10 | Do. |
| 192 | 0.163 | 0.017 | | | 2.49 | 0.122 | 25 | $V_2$ | 10.5 | Do. |
| 193 | 0.163 | 0.017 | | | 2.49 | 0.155 | 25 | V | 10 | Do. |
| 194 | 0.163 | 0.029 | | | 2.49 | 0.150 | 25 | $V_2$ | 10.5 | Do. |
| 195 | 0.44 | | | 0.19 | 0.92 | | 25 | X | 11 | Do. |
| | | | | | | | 20 | V | | Do. |
| 196 | 0.44 | | | 0.19 | 0.92 | 0.055 | 25 | X | 11 | Do. |
| 197 | 0.44 | | | 0.49 | 0.92 | 0.055 | 25 | X | 11 | Do. |
| 198 | 0.44 | | 1.01 | 0.49 | 0 92 | 0 055 | 25 | V | 11 | Do. |
| | | | | | | | 30 | V | | Do. |
| | | | | | | | 34 | S | | Do. |
| 199 | 0.44 | | 2.00 | 0.49 | 0.92 | 0.555 | 25 | $V_2$ | 11 | Do. |
| | | | | | | | 39 | V | | Do. |
| | | | | | | | 44 | M | | Do. |
| | | | | | | | 48 | S | | Do. |
| 200 | 0.44 | | 3.01 | 0.49 | 0.92 | 0.055 | 25 | X | 11 | Precipitate. |
| | | | | | | | 52 | S | | Clear. |
| 201 | 0.44 | | 3.01 | 1.13 | 0.92 | 0.055 | 25 | X | 11 | Precipitate. |

*Calcium added as calcium chloride.

The amine oleate systems are highly active when freshly prepared. However, there is a decline in their efficacy as positive nonsimple liquids with time or age. The rate of decline is markedly decreased if the pH is increased from a value of 8 to about 10.

It has been found that the addition of certain mixed amine acid compounds will increase the length of time which the additive remains effective by a factor of 10 to 12. Table XVI illustrates a preferred positive nonsimple liquid containing secondary butylamine oleate and having added thereto 0.05 percent by weight ethylamine hydrochloride which will remain active for a long period of time.

TABLE XVI.—SECONDARY BUTYLAMINE OLEATE WITH ETHYLAMINE HYDROCHLORIDE

| | |
|---|---|
| System No. | 202 |
| s-BA oleate, wt. percent | 0.10 |
| KOH, wt. percent | 0.015 |
| $C_2H_5NH_2$ HCl, wt. percent | 0.05 |
| pH | 10 |
| Temp. range, degree C. | 5–49 |
| Optimum temp., degree C. | 41 |

The same general trends as have been previously observed with the foregoing positive nonsimple liquids apply to the amine oleate solutions. The optimum activity of these solutions is a function of temperature, pH, and salt concentration, as shown in FIGURES 6, 7, 8, 9, and 10. A positive nonsimple liquid comprising an aqueous solution of 0.15 percent by weight secondary butylamine oleate, 0.008 percent by weight sodium hydroxide, and 0.06 percent by weight ethylamine hydrochloride was used in obtaining the data for FIGURE 6 and FIGURE 7. The same solution, except the amount of sodium hydroxide, was varied to change the pH and thus obtain the data for FIGURE 8. The same system used in obtaining data for FIGURE 6 and FIGURE 7 was used in obtaining data for FIGURES 9 and 10, only the amount of the system or additive was changed to illustrate the effect of concentration. Large quantities of chelating agent may be incorporated into the amine oleate solution without loss of activity. Calcium ion up to 1600 p.p.m., 0.16 percent by weight, may be present without destroying the activity. Systems 191 and 194 demonstrate with tabular data the sensitivity of the systems to the pH level.

Table XVII illustrates that a positive nonsimple liquid can be formed employing ring compounds, e.g., piperidinium oleate.

TABLE XVII.—PIPERIDINIUM OLEATE SYSTEMS

| System No. | Oleate, Wt. percent | T., °C. | Rank | pH | Description |
|---|---|---|---|---|---|
| 203 | 0.12 | 25 | V | 7.5 | Clear. |
| 204 | 0.15 | 25 | $V_1$ | 7.5 | Do. |
| | | 30 | V | ----- | Do. |
| | | 38 | M | ----- | Do. |
| | | 40 | S | ----- | Do. |

In another embodiment of the invention, a positive nonsimple liquid is created by forming a dilute aqueous solution having therein an effective concentration of from 0.001 to 1 percent by weight, preferably 0.01 to 0.1 percent by weight, of amine stearate or amine palmitate. Such aqueous solutions are effective in subterranean formations having elevated temperatures, e.g., above 70° C. They have less tolerance for sodium chloride in the aqueous solution than do the amine oleates but, similar to the other saturated soap solutions, are active at lower concentrations of additive. The positive nonsimple aqueous solution should be alkaline, i.e., have a pH greater than 7. Table XVIII and Table XIX below summarize data typical of these aqueous solutions. Secondary butylamine stearate and secondary butylamine palmitate are typical examples illustrating the behavior of these aqueous solutions. A slight excess of secondary butylamine is useful in extending the duration of the activity of the systems illustrated in Table XVIII and Table XIX.

TABLE XVIII.—SECONDARY BUTYLAMINE STEARATE

| System No. | s-BA Stearate, Wt. Percent | s-BA, Wt. Percent | NaCl, Wt. Percent | pH | T., °C. | Rank |
|---|---|---|---|---|---|---|
| 205 | 0.031 | 0.0075 | 0 | 8.0 | 27 | S |
| | | | | | 28 | X |
| 206 | 0.031 | 0.029 | 0 | 10.5 | 30 | $V_2$ |
| | | | | | 38 | $V_2$ |
| | | | | | 46 | V |
| | | | | | 61 | V |
| | | | | | 69 | M |
| | | | | | 74 | S |
| | | | | | 75 | X |
| 207 | 0.031 | 0.029 | 0.2 | 10.5 | 51 | $V_2$ |
| | | | | | 60 | $V_2$ |
| | | | | | 70 | M |
| | | | | | 72 | S |
| | | | | | 73 | X |
| 208 | 0.031 | 0.029 | 0.4 | 10.5 | 60 | $V_2$ |
| | | | | | 66 | V |
| | | | | | 68 | M |
| | | | | | 70 | S |
| | | | | | 71 | X |
| 209 | 0.063 | 0.015 | 0 | 8.5 | 37 | $V_2$ |
| | | | | | 45 | V |
| | | | | | 55 | M |
| | | | | | 58 | S |
| | | | | | 59 | X |
| 210 | 0.063 | 0.035 | 0 | 10.5 | 36 | $V_2$ |
| | | | | | 48 | V |
| | | | | | 64 | V |
| | | | | | 69 | M |
| | | | | | 72 | S |
| | | | | | 77 | S |
| | | | | | 78 | X |
| 211 | 0.063 | 0.035 | 0.2 | 10.5 | 41 | $V_2$ |
| | | | | | 68 | V |
| | | | | | 72 | M |
| | | | | | 75 | S |
| | | | | | 76 | X |
| 212 | 0.063 | 0.035 | 0.6 | 10.5 | 50 | $V_2$ |
| | | | | | 61 | V |
| | | | | | 69 | S |
| | | | | | 70 | X |

TABLE XIX.—SECONDARY BUTYLAMINE PALMITATE

| System No. | s-BA Palmitate, Wt. Percent | s-BA, Wt. Percent | NaCl, Wt. Percent | pH | T., °C | Rank | Description |
|---|---|---|---|---|---|---|---|
| 213 | 0.102 | 0.04 | 0 | 10.5 | 22 | $V_2$ | Slight opal. |
|  |  |  |  |  | 23 | $V_2$ | Clear. |
|  |  |  |  |  | 33 | $V_2$ | Do. |
|  |  |  |  |  | 43 | V | Do. |
|  |  |  |  |  | 53 | V | Do. |
|  |  |  |  |  | 58 | M | Do. |
|  |  |  |  |  | 63 | S | Do. |
|  |  |  |  |  | 65 | S | Do. |
|  |  |  |  |  | 66 | X | Do. |
| 214 | 0.102 | 0.04 | 0.2 | 10.5 | 45 | $V_2$ | Do. |
|  |  |  |  |  | 58 | V | Do. |
|  |  |  |  |  | 64 | M | Do. |
|  |  |  |  |  | 67 | S | Do. |
|  |  |  |  |  | 70 | S | Do. |
|  |  |  |  |  | 71 | X | Do. |
| 215 | 0.102 | 0.04 | 0.5 | 10.5 | 51 | V | Do. |
|  |  |  |  |  | 58 | V | Do. |
|  |  |  |  |  | 61 | V | Do. |
|  |  |  |  |  | 65 | M | Do. |
|  |  |  |  |  | 71 | S | Do. |
|  |  |  |  |  | 73 | S | Do. |
|  |  |  |  |  | 74 | X | Do. |

In another embodiment of the invention, a positive nonsimple liquid is created by forming a dilute aqueous solution having therein an effective concentration of from 0.001 to 0.5 percent by weight of copper cetyl phenyl ether sulfonate. The copper cetyl phenyl ether sulfonate is also called the copper salt of cetyl phenyl ether sulfonic acid. This additive, when used in the concentration ranges above, is effective at temperatures up to 80° to 99° C. If the entire floodwater is treated, an optimum concentration of the copper salt of cetyl phenyl ether sulfonic acid will lie between 0.01 to 0.05 percent by weight. Where a relatively small slug of water is to be treated, a higher concentration on the order of 0.05 to 0.5 percent by weight can be used to increase the effectiveness of the slug in recovering additional oil. This can in turn be followed by a solution having from 0.001 to 0.05 percent by weight of the copper salt and achieve significant increase in recovery. Alternatively, the slug or slugs may be followed by untreated water.

The copper cetyl phenyl ether sulfonate is effective in aqueous solution at a pH from 4.5 to about 10.5.

The copper salt of cetyl phenyl ether sulfonic acid is also subject to ion exchange with the divalent ions and should be protected by either a preflush or buffering of the formation waters with sodium Versenate or Calgon as discussed above.

In another embodiment of the invention, a positive nonsimple liquid is created by forming a dilute aqueous solution having therein an effective concentration of from 0.001 to 1 percent by weight, preferably from 0.01 to 0.2 percent by weight, of acid salts of hexadecylamine and octadecylamine, e.g., hexadecylamine hydrochloride, hexadecylamine hydrosulfamate, octadecylamine hydrochloride, and octadecylamine hydrosulfamate; and an excess of hydrogen ion, e.g., 0.05 to 1 percent by weight of hydrochloric acid or sulfamic acid, the acid being selected in correspondence with the acid ion of the above compound. Table XX and Table XXI illustrate temperatures at which these additives in solution provide a flooding liquid which is a positive nonsimple liquid.

TABLE XX.—HEXADECYLAMINE HYDROCHLORIDE SYSTEM

| | |
|---|---|
| System No. | 216 |
| Water, wt. percent | 99.8 |
| Hexadecylamine hydrochloride, wt. percent | 0.11 |
| Hydrochloric acid, wt. percent | 0.05 |
| Operable temp. range, ° C. | 35–48 |
| Optimum temp., ° C. | 45 |

TABLE XXI

| System No. | Water, Wt. percent | Hexadecylamine Hydrosulfamate, Wt. percent | Sulfamic Acid, Wt. percent | Sodium Chloride, Wt. percent | Operable Temp., °C | Optimum Temp., °C |
|---|---|---|---|---|---|---|
| 217 | 99.4 | 0.1 | 0.5 | 0 | 43–55 | 50 |
| 218 | 98.4 | 0.1 | 0.5 | 1 | 34–66 | 35 |

The addition of sodium chloride does not increase the upper temperature limit at which solutions of acid salts of hexadecylamine and octadecylamine remain active as it does with solutions of the alkaline soaps. The presence of more than about 0.5 percent of sodium chloride destroys the efficacy of the acid salts; therefore, solutions of these salts should be employed in environments where only low salt concentrations are likely to be encountered.

Additionally, the acid salts do not precipitate from solutions as readily in the presence of the divalent ions, such as $Ca^{++}$ or $Mg^{++}$.

Table XXII shows the adverse effects of sodium chloride. The octadecylamine acid systems form positive nonsimple liquids useful at elevated temperatures, e.g., about 60° to 80° C.

TABLE XXII.—ACID SYSTEMS

| System No. | Hexadecylamine Hydrochloride, Wt. percent | HCl, Wt. percent | NaCl, Wt. percent | T., °C. | Rank | pH | Description |
|---|---|---|---|---|---|---|---|
| 219 | 0.11 | 0.055 | | 25 | X | 2.5 | Precipitate. |
| | | | | 35 | M | | Do. |
| | | | | 40 | $V_2$ | | Clear. |
| | | | | 45 | $V_2$ | | Do. |
| | | | | 58 | S | | Do. |
| 220 | 0.11 | 0.055 | 1.03 | 25 | X | 2.5 | Precipitate. |

| System No. | Octadecylamine Hydrosulfamate, Wt. percent | Sulfamic Acid, Wt. | NaCl, Wt. percent | T., °C. | Rank | pH | Description |
|---|---|---|---|---|---|---|---|
| 221 | 0.163 | 0.768 | | 35 | X | 3.5 | Precipitate. |
| | | | | 55 | M | | Do. |
| | | | | 65 | $V_2$ | | Do. |
| | | | | 78 | $V_3$ | | Clear. |
| | | | | 82 | S | | Do. |
| | | | | 58 | $V_3$ | | Precipitate. |
| 222 | 0.163 | 0.768 | 1.0 | 25 | X | 3.5 | Do. |
| | | | | 44 | X | | Clear. |
| 223 | 0.38 | 2.55 | 1.0 | 25 | X | 2.0 | Precipitate. |
| | | | | 92 | X | | Do. |
| 224 | 0.38 | 5.2 | 1.0 | 25 | X | 1.0 | Do. |
| 225 | 0.19 | 2.6 | 0.5 | 25 | X | 2.0 | Do. |

Two or more positive nonsimple liquids, or two or more systems to provide a positive nonsimple liquid, may be combined to extend the temperatures of operability. For example, the copper salt of cetyl phenyl ether sulfonic acid in aqueous solution provides a positive nonsimple liquid and imparts shear hardening properties up to a temperature of 99° C. at concentrations from 0.02 to 0.1 percent by weight. The material does not function as a shear hardener at temperatures below 75° C., however. In steeply dipping formations, it is possible to have widely varying temperature gradients. Thus, wells may be completed in a formation at very substantial depths and have elevated temperatures while the wells in the shallower region of the same formation will have much lower temperatures. For example, one oil field in California has wells completed in the same formation with as much as 15,000 feet difference in completion depths. To achieve a positive nonsimple liquid from the copper salt which will be operable throughout a formation with temperatures below 75° C. as well as above 75° C., the range of operability has to be broadened. This can be achieved, for example, by employing approximately 0.1 percent sodium oleate and about 1.3 percent sodium chloride with the copper salt. The range of operability is thus lowered to about 35° C. Accordingly, chemically compatible combinations of the foregoing systems may be added to a waterflood to tailor the temperature or pH range of operability to the particular formation. Chemically compatible combinations are those which do not interact to neutralize each other, e.g., an alkaline positive nonsimple liquid could not be used with an acid positive nonsimple liquid.

*Miscible flooding liquid*

In miscible flooding operations, the premature breakthrough of the driving fluid, such as natural gas, into a well is a most troublesome aspect. Such premature breakthrough is generally caused by the presence in the formation of a zone having greater permeability than any other zone such that the miscible liquid bank which was either injected or formed between the in-situ oil and the driving fluid flows preferentially into the more permeable zone. In the ensuing operations or pattern development, the thinning ring of miscible liquid is overridden by the driving fluid with the resultant breakthrough of the more mobile driving fluid. Thereafter, the ever increasing driving fluid-oil ratio affects the economics adversely.

In another embodiment of the invention, a positive nonsimple liquid is created by forming a dilute hydrocarbon solution having therein a concentration of from 0.05 to 0.2 percent by weight of an aluminum soap of a fatty or a naphthenic acid. An example is 0.1 percent aluminum n-octanoate dissolved in Sovasol. At higher concentrations of the soap, the positive nonsimple liquid becomes more active. However, at concentrations of 0.5 percent or more of the soap in hydrocarbon solvent, the liquid is gel-like in behavior and has a yield point which is higher than advisable for use in a miscible flood in relatively low temperature formations. The hydrocarbon solutions of the aluminum soaps of fatty and naphthenic acids remain positive nonsimple liquids over a wide range of temperatures, e.g., 21° to 110° C. for the foregoing example of aluminum n-octanoate.

By aluminum soaps of fatty acids is meant the aluminum salts of the fatty acids having between 6 and 18 carbon atoms per alkanoate radical. Preferably, such alkanoate radicals are branched chain alkanoate radicals and contain from 8 to 13 carbon atoms per alkanoate radical. Further, the branch chains are preferably methyl groups. A minor portion of ethyl and even propyl branch chains is permissible. When soaps containing branched chain alkanoate radicals are used, it is preferred that the longest straight carbon chain have at least 5 carbon atoms therein. When a soap of a normal fatty acid is used, it is preferred that there be at least 8 carbon atoms in the longest straight carbon chain.

A specific example of an isoalkanoate soap which may be employed is aluminum trimethylpentanoate. Another specific example of an isoalkanoate is trimethyldecanoate. The octanoates and nonanoates are particularly effective. The higher n-alkanoates can be used at elevated temperatures, e.g., above 40° C. They are, therefore, useful in formations having such higher temperatures. Mixtures of these aluminum soaps may be used. The aluminum salt of commercial naphthenic acid is also useful.

By hydrocarbon solvent is meant a petroleum hydrocarbon fraction boiling within the range of from about −30° to 600° F. Such solvent includes a wide range of liquefied petroleum gases, gasolines, kerosines, diesel fuels, and naphtha cuts.

In an alternative embodiment of the invention, nitrocellulose is dissolved in n-butyl acetate and the resulting solution is added to a hydrocarbon solvent to form a positive nonsimple hydrocarbon solution. There must be as much as 2 percent or more by weight of nitrocellulose in the hydrocarbon solution to convert it to a positive nonsimple liquid.

While the invention has been described particularly in connection with the recovery of oil from a subterranean formation by displacement of the oil therein, it will be understood that the invention is also applicable to other operations carried out in a subterranean formation. For example, a subterranean formation may be treated by the injection, and flow, therein of a positive nonsimple liquid for fracturing of the formation. Further, a subterranean formation may be treated by the injection and flow, therein of a positive nonsimple liquid in conjunction with a solvent whereby said solvent more uniformly dissolves solid matter and increases the permeability of the subterranean formation.

Thus it can be seen that the invention provides a broad new concept for recovering oil from subterranean formations. The concept is to change the viscosity of the flooding liquid in a manner such that it becomes relatively more viscous in the more permeable domains of the subterranean formation than in the less permeable domains. The invention has provided specific procedures whereby a prospective liquid can be evaluated for its efficacy as a flooding liquid. Many more modifications will occur to one skilled in the art. It is intended that those modifications which fall within the scope of the appended claims are covered by this invention.

What is claimed is:

1. In a method for recovering oil from an oil-containing subterranean formation the step which comprises passing from an injection well toward a production well in said formation a positive nonsimple liquid comprising a hydrocarbon solvent and, in quantity based on the amount of said liquid, an additive selected from the group consisting of:
   (1) 0.05 to 0.2 percent by weight of an aluminum soap of a fatty acid having an alkanoate radical having between 7 and 13 carbon atoms;
   (2) 0.05 to 0.2 percent by weight of an aluminum soap of naphthenic acid; and
   (3) at least 2 percent by weight nitrocellulose dissolved in n-butyl acetate;
whereby oil is displaced toward said production well.

2. The method of claim 1 wherein said alkanoate radical contains 8 to 10 carbon atoms.

3. The method of claim 1 wherein said positive nonsimple liquid comprises a hydrocarbon solvent and 0.05 to 0.2 percent by weight of an aluminum soap of naphthenic acid.

4. The method of claim 1 wherein said positive nonsimple liquid comprises a hydrocarbon solvent containing at least 2 percent by weight nitrocellulose dissolved in n-butyl acetate.

5. The method of claim 1 wherein said positive nonsimple liquid comprises a hydrocarbon solvent and 0.05 to 0.2 percent by weight of an aluminum soap of a fatty acid selected from the group consisting of aluminum trimethylpentanoate and aluminum trimethyldecanoate.

References Cited

UNITED STATES PATENTS

| | | |
|---|---|---|
| 2,596,844 | 5/1952 | Clark. |
| 2,670,048 | 2/1954 | Menaul. |
| 2,724,439 | 11/1955 | Brainerd. |
| 2,866,754 | 12/1958 | Cardwell et al. _____ 252—8.55 |
| 3,198,252 | 8/1965 | Walker et al. _____ 166—32 |
| 3,221,810 | 12/1965 | Marx _____ 166—9 X |
| 3,256,933 | 6/1966 | Murphree et al. _____ 166—9 X |
| 3,261,399 | 7/1966 | Coppel _____ 166—9 |

STEPHEN J. NOVOSAD, *Primary Examiner.*

UNITED STATES PATENT OFFICE
CERTIFICATE OF CORRECTION

Patent No. 3,398,792

August 27, 1968

Milton K. Abdo

It is certified that error appears in the above identified patent and that said Letters Patent are hereby corrected as shown below:

Column 1, line 30, "hexadecylamide" should read -- hexadecylamine --. Column 2, line 42, "taugnt" should read -- taught --. Column 5, line 45, "rhoeological" should read -- rheological --. Columns 13 and 14, TABLE IV, insert as line 2 of the footnote -- No. 48: Still $V_2$ after 32 days --. Columns 15 and 16, TABLE VII, footnote 1 thereof, "dispensed" should read -- dispersed --. Column 15, line 59, "aqeuous" should read -- aqueous --. Column 17, line 65, "ammonuim" should read -- ammonium --. Columns 19 and 20, TABLE XV, tenth column, lines 7 to 10 thereof, "9", each occurrence, should read -- 8 --. Columns 21 and 22, TABLE XV, continued, fourth column, line 22 thereof, "1.94" should read -- 1.97 --. Column 24, line 6, "Systems 191 and 194" should read -- Systems 191 to 194 --. Column 25, line 29, "cooper" should read -- copper --; line 61, "increase" should read -- increases --. Columns 27 and 28, TABLE XXII, fifth column, line 7 thereof, insert -- 35 --; same table, sixth column, line 7 thereof, insert -- S --; same table, eighth column, line 7 thereof, insert -- Clear --; same table, fifth column, line 8 thereof, "35" should read -- 25 --; same table, in the heading to the third column, after "Sulfamic Acid, Wt." insert -- percent --.

Signed and sealed this 10th day of February 1970.

(SEAL)
Attest:

EDWARD M. FLETCHER, JR.
Attesting Officer

WILLIAM E. SCHUYLER, JR.
Commissioner of Patents